United States Patent
Yokoya et al.

(10) Patent No.: US 11,803,178 B2
(45) Date of Patent: Oct. 31, 2023

(54) EVENT ESTIMATION SYSTEM AND EVENT ESTIMATION METHOD

(71) Applicant: KABUSHIKI KAISHA YASKAWA DENKI, Kitakyushu (JP)

(72) Inventors: Tsuyoshi Yokoya, Kitakyushu (JP); Masaru Adachi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 166 days.

(21) Appl. No.: 17/072,623

(22) Filed: Oct. 16, 2020

(65) Prior Publication Data

US 2021/0116901 A1    Apr. 22, 2021

(30) Foreign Application Priority Data

Oct. 18, 2019   (JP) .................................. 2019-191543

(51) Int. Cl.
  *H02M 1/12*   (2006.01)
  *G05B 23/02*  (2006.01)
  (Continued)

(52) U.S. Cl.
  CPC ....... *G05B 23/024* (2013.01); *G05B 13/0265* (2013.01); *G06N 3/045* (2023.01); *H02P 29/10* (2016.02)

(58) Field of Classification Search
  CPC .................................. G06N 3/02; H02L 67/10
  See application file for complete search history.

(56) References Cited

U.S. PATENT DOCUMENTS

| | | |
|---|---|---|
| 10,747,197 B2 * | 8/2020 | Satou ................. B23Q 17/0995 |
| 2017/0220008 A1 | 8/2017 | Takahashi et al. |

(Continued)

FOREIGN PATENT DOCUMENTS

| | | |
|---|---|---|
| JP | H03-145894 A | 6/1991 |
| JP | 2002-023845 A | 1/2002 |

(Continued)

OTHER PUBLICATIONS

Office Action dated Feb. 18, 2020 in corresponding Japanese Patent Application No. 2019-191543 (with English Translation), 9 pages.

(Continued)

*Primary Examiner* — Bickey Dhakal
*Assistant Examiner* — Charles S Laughlin
(74) *Attorney, Agent, or Firm* — Oblon, McClelland, Maier & Neustadt, L.L.P.

(57) ABSTRACT

An event estimation system includes an upper device, and a lower controller device including first circuitry that acquires operation information of a control target device connected to the lower controller device, estimates a presence or absence of an abnormality based on the operation information, holds the operation information for a certain time period, and transmits, based on the presence or absence of an abnormality and to the upper device, the operation information related to the estimation of the presence or absence of the abnormality. The upper device has second circuitry that receives the operation information from the lower controller device, and operates according to the presence or absence of the abnormality, inputs, using an upper neural network model, the operation information, output event information, and estimates an event.

20 Claims, 18 Drawing Sheets

(51) Int. Cl.
*G05B 13/02* (2006.01)
*H02P 29/10* (2016.01)
*G06N 3/045* (2023.01)

(56) References Cited

U.S. PATENT DOCUMENTS

2018/0307203 A1 10/2018 Aizawa et al.
2020/0042836 A1* 2/2020 Okada .................. G06K 9/6297

FOREIGN PATENT DOCUMENTS

| | | | |
|---|---|---|---|
| JP | 2003-169032 A | 6/2003 | |
| JP | 2008-033532 A | 2/2008 | |
| JP | 2012-164307 A | 8/2012 | |
| JP | 2014-079050 A | 5/2014 | |
| JP | 2016-071444 A | 5/2016 | |
| JP | 6031202 B1 | 10/2016 | |
| JP | 2018-181216 A | 11/2018 | |
| WO | WO 2019/106875 A1 | 6/2019 | |

OTHER PUBLICATIONS

Office Action dated Jul. 14, 2020 in corresponding Japanese Patent Application No. 2019-191543 (with English Translation), 7 pages.
Office Action dated May 24, 2023 in Japanese Patent Application No. 2020-185282, with concise English translation, citing documents 15-17 therein.

* cited by examiner

EVENT ESTIMATION SYSTEM AND EVENT ESTIMATION METHOD

CROSS-REFERENCE TO RELATED APPLICATIONS

The present application is based upon and claims the benefit of priority to Japanese Patent Application No. 2019-191543, filed Oct. 18, 2019. The entire contents of this application are incorporated herein by reference.

BACKGROUND OF THE INVENTION

Field of the Invention

The present invention relates to an event estimation system and an event estimation method.

Description of Background Art

Japanese Patent No. 6031202 describes a cell control device that detects an abnormality due to internal information of a manufacturing machine such as a robot. Japanese Patent No. 6031202 describes that the cell control device further includes a learning device that updates information stored in a database by performing machine learning using the internal information of the manufacturing machine and device structure information about structural elements of a manufacturing device. The entire contents of this publication are incorporated herein by reference.

SUMMARY OF THE INVENTION

According to one aspect of the present invention, an event estimation system includes an upper device, and a lower controller device including first circuitry that acquires operation information of a control target device connected to the lower controller device, estimates a presence or absence of an abnormality based on the operation information, holds the operation information for a certain time period, and transmits, based on the presence or absence of an abnormality and to the upper device, the operation information related to the estimation of the presence or absence of the abnormality. The upper device has second circuitry that receives the operation information from the lower controller device, and operates according to the presence or absence of the abnormality, inputs, using an upper neural network model, the operation information, output event information, and estimates an event.

According to another aspect of the present invention, an event estimation method includes: acquiring, using a lower controller device, operation information of a control target device connected to the lower controller device; estimating, using a lower controller device, a presence or absence of an abnormality based on the operation information; holding, using a lower controller device, the operation information for a certain time period; based on the presence or absence of the abnormality, transmitting, to an upper controller device, the operation information related to the estimation of the presence or absence of the abnormality; receiving, using the upper controller device, the operation information from the lower controller device; and estimating, using the upper controller device, an event by causing an upper neural network model to input the operation information and output event information according to the presence or absence of the abnormality.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
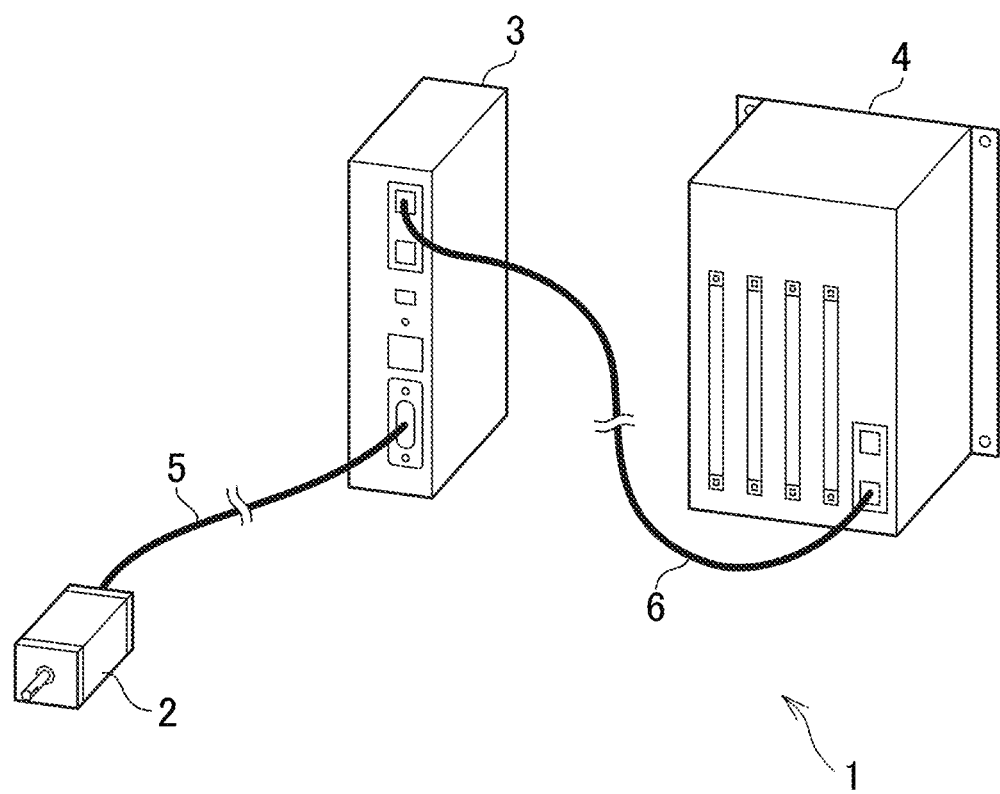
FIG. 1 is an overall external view illustrating an example of an event estimation system according to a first embodiment of the present invention.

Embodiments will now be described with reference to the accompanying drawings, wherein like reference numerals designate corresponding or identical elements throughout the various drawings.

In the following, an event estimation system and an event estimation method according to a first embodiment of the present invention are described with reference to FIGS. 1-7.

FIG. 1 is an overall external view illustrating an example of an event estimation system 1 according to a first embodiment of the present invention. Here, the term "event estimation system" refers to a system that estimates whether or not some event has occurred in a control target device 2 in any control system. Therefore, the event estimation system 1 is designed to detect a change in a control system early and without manpower, without relying on manual inspection or observation by an operator or the like.

As illustrated in FIG. 1, the event estimation system 1 includes the control target device 2 and two types of controllers: a lower controller 3 and an upper controller 4. The control target device 2 and the lower controller 3 are connected to each other via a first line 5, and the lower controller 3 and the upper controller 4 are connected to each other via a second line 6.

Here, the term "controller" refers to a device that can be used for FA and has a function of controlling some other device (the control target device 2) or inputting/outputting information to/from another device. In the example illustrated in FIG. 1, the lower controller 3 is illustrated as a so-called servo controller and the upper controller 4 is illustrated as a PLC (programmable logic controller). However, the lower controller 3 and the upper controller 4 may be other devices, for example, may each be a computer such as a single board microcomputer or a general PC (personal computer). An actual use of a controller is not limited to FA. A controller may be used not only in production equipment but may also be used by being incorporated in various apparatuses such as vehicles and amusement devices.

The control target device 2 is a device that is controlled by the lower controller 3 or inputs/outputs information indicating a state of the device. In the example of FIG. 1, a servo motor is illustrated as the control target device 2, and hereinafter, in the present specification, description is given in which as an example a servo motor is used as the control target device 2. The control target device 2 may be other types of rotary electric motors (for example, a stepping motor), a linear motor, a solenoid, various actuators such as a pneumatic device, a switch, a sensor, and the like. Further, it is not necessary that only one control target device 2 is connected to the lower controller 3. Multiple control target devices 2 may be connected to the lower controller 3.

As illustrated in FIG. 1, the lower controller 3 is characterized by controlling the control target device 2 as a direct target. Therefore, the first line 5 has sufficient capacity in communication speed or in power supply required for controlling the control target device 2. As in the present example, when the control target device 2 is a servo motor, a control period thereof is in a range of several to several tens of microseconds. In every control period, power is supplied from the lower controller 3 via the first line 5, and, output values from various sensors such as an encoder provided in the control target device 2 are transmitted from the control target device 2.

The upper controller 4 is characterized by indirectly controlling the control target device 2 by controlling the lower controller 3. FIG. 1 illustrates a case where only one lower controller 3 is connected to one upper controller 4. However, multiple lower controllers 3 may be connected to the upper controller 4. Further, the upper controller 4 may be further connected to another control target device (not illustrated in the drawings) such as a switch and directly controls the control target device. In any case, the lower controller 3 and the upper controller 4 are connected to each other by the second line 6, and the second line 6 has sufficient capacity in communication speed required for controlling the lower controller 3. As in the example illustrated in FIG. 1, when the upper controller 4 is a PLC, since a control period (so-called scan time) thereof is in a range of several hundreds of microseconds to several tens of milliseconds, the second line 6 is capable of transmitting a command or information in every control period.

Therefore, in many cases, simply from a point of view of communication speeds, when the first line 5 and the second line 6 are compared to each other, the first line is faster. In other words, the speed of obtaining operation information in the lower controller 3 is faster than the speed of receiving operation information in the upper controller 4. Therefore, it is expected that it is difficult to transmit all information collected from the control target device 2 by the lower controller 3 to the upper controller 4 in real time.

Figure 2:
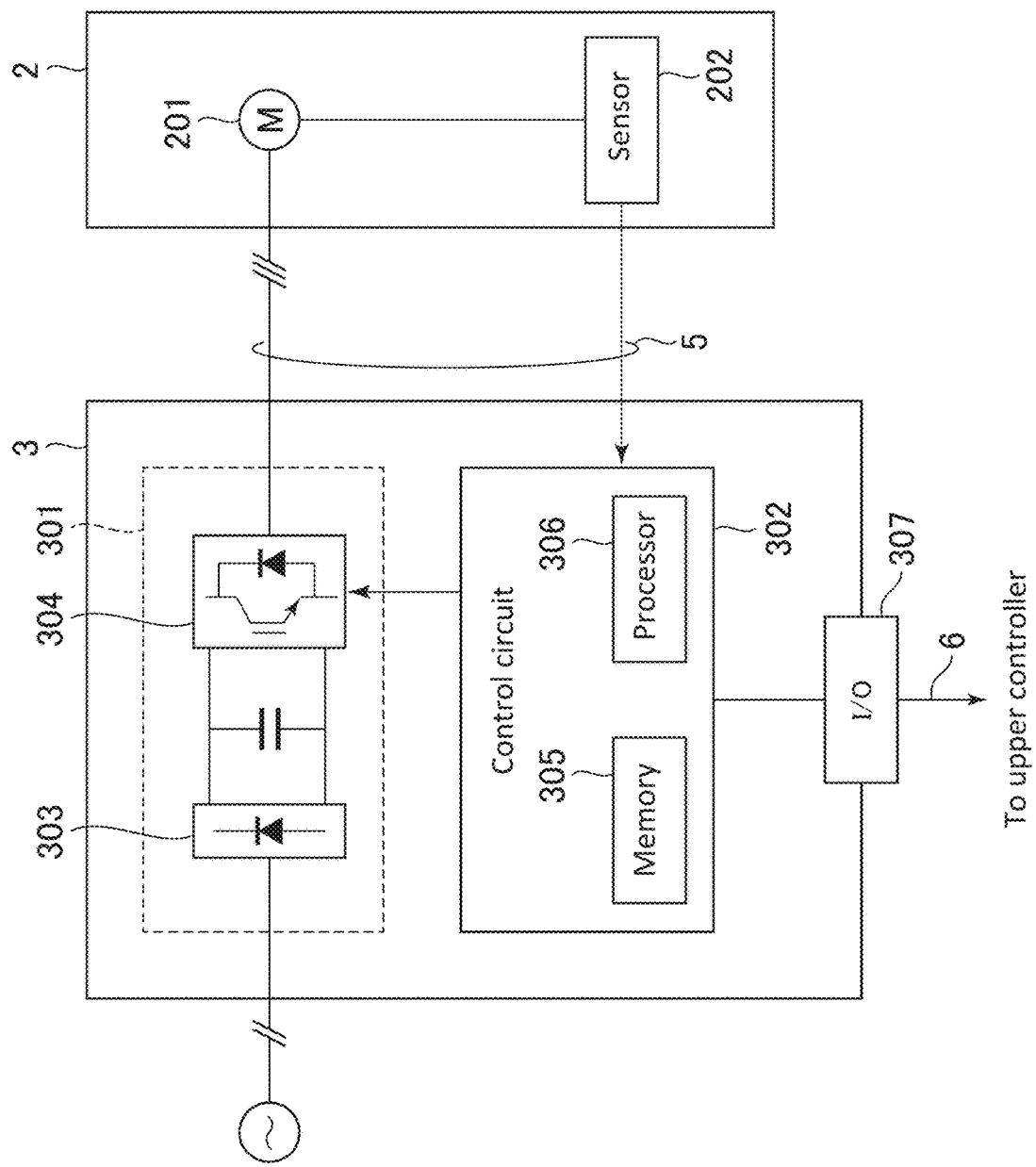
FIG. 2 is a block diagram illustrating an example of hardware structures of a control target device and a lower controller of the event estimation system according to the first embodiment of the present invention.

FIG. 2 is a block diagram illustrating an example of hardware structures of the control target device 2 and the lower controller 3 of the event estimation system 1 according to the present embodiment. Here, the control target device 2 is a servo motor and includes a three-phase electric motor 201 and a sensor 202. The three-phase electric motor 201 is illustrated as an example of an electric motor. The number of the phases of the electric motor is not particularly limited, and the electric motor may be a multi-phase electric motor of two phases or four or more phases. Further, in the sensor 202, a rotary encoder is included. However, in addition, various sensors such as a thermometer, a vibration meter, an ammeter/voltmeter, and a torque sensor may be included. Further, instead of the rotary encoder, a rotation angle detector of another type such as a resolver may be used. The type of the electric motor is not limited. An induction electric motor, a permanent magnet synchronous electric motor, and other various types of electric motors may be used.

Further, the lower controller 3 includes a servo amplifier 301 and a control circuit 302. In the servo amplifier 301, a DC current converted by an AC/DC converter 303 is converted into a three-phase AC current suitable for driving the three-phase electric motor 201 by an inverter 304, and the three-phase AC current is output. Control of the inverter 304 is performed by the control circuit 302. In the control circuit 302, based on various information stored in a memory 305, a control command (for example, a current command value) that a processor 306 gives to the inverter 304 is determined. Further, a rotation angle of the three-phase electric motor 201 detected by the sensor 202 or other information is input to the control circuit 302 and is used in controlling the three-phase electric motor 201. In the present example, the memory 305 stores various parameters or operation patterns for determining an operation waveform of the three-phase electric motor 201, and, as will be described later, also stores information from the sensor 202.

As illustrated in FIG. 2, the control target device 2 and the lower controller 3 are connected to each other by the first line 5. The first line 5 includes both a power supply line for supplying power from the servo amplifier 301 to the three-phase electric motor 201 and an information communication line for transmitting information from the sensor 202 to the control circuit 302. On the other hand, via an input-output 307 of the lower controller 3, the upper controller 4 and the control circuit 302 are connected to each other by the second line 6 such that information can be communicated therebetween. In the present example, a communication speed of the information communication line included in the first line 5 is higher than that of the second line 6. It is assumed that information acquired by the sensor 202 and a control command instructed by the control circuit 302 to the inverter 304 cannot be transmitted to the upper controller 4 in real time.

Figure 3:
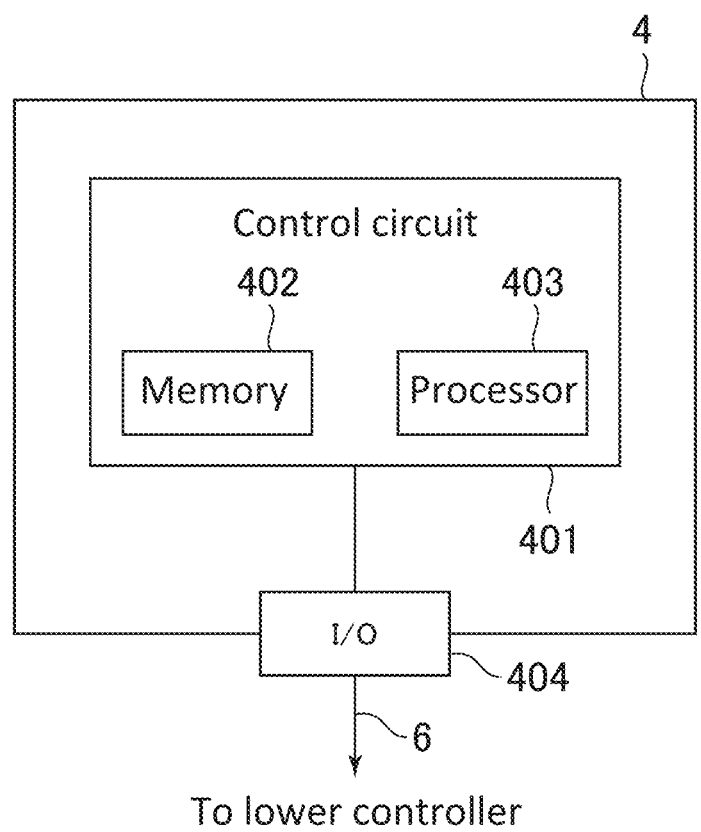
FIG. 3 is a block diagram illustrating an example of a hardware structure of an upper controller of the event estimation system according to the first embodiment of the present invention.

FIG. 3 is a block diagram illustrating an example of a hardware structure of the upper controller 4 of the event estimation system 1 according to the present embodiment. The upper controller 4 has a control circuit 401 that includes a processor 403 and a memory 402. The control circuit 401 outputs necessary instructions and the like according to a program stored in the memory 402 to various devices connected via an input-output 404, and, receives information input from the various devices, and performs computation required for control and saves the information in the memory 402. As described above, in the present example, the upper controller 4 is connected to the lower controller 3 via the input-output 404 by the second line 6.

As described above, the lower controller 3 and the upper controller 4 are respectively provided with the control circuits (the control circuit 302 and the control circuit 401), and respectively have the memories (the memory 305 and the memory 402) and the processors (the processor 306 and the processor 403). However, the two are different in information processing capacity. When the two are compared to each other in terms of general computing power, the upper controller 4 is usually superior to the lower controller 3.

Since the lower controller 3 is designed to be particularly suitable for controlling the connected control target device 2, it is sufficient as long as performances of the memory 305 and the processor 306 are sufficient for controlling the control target device 1. Therefore, providing performances far exceeding those required is redundant and merely increases cost, and is usually not done. On the other hand, since the upper controller 4 is designed as a general-purpose product, and its uses are diverse and are not limited, the upper controller 4 is designed to be able to handle a heaviest information processing load that can be expected in using a device, and thus, it is usual to provide a margin in computational performance.

The present example assumes such a case. Regarding the control of the control target device 1, the lower controller 3 is capable of performing low-load additional information processing, but does not have enough capacity to perform high-load additional information processing. On the other hand, in addition to the control of the lower controller 3, the upper controller 4 has some extra capacity to perform certain high-load additional information processing.

Figure 4:
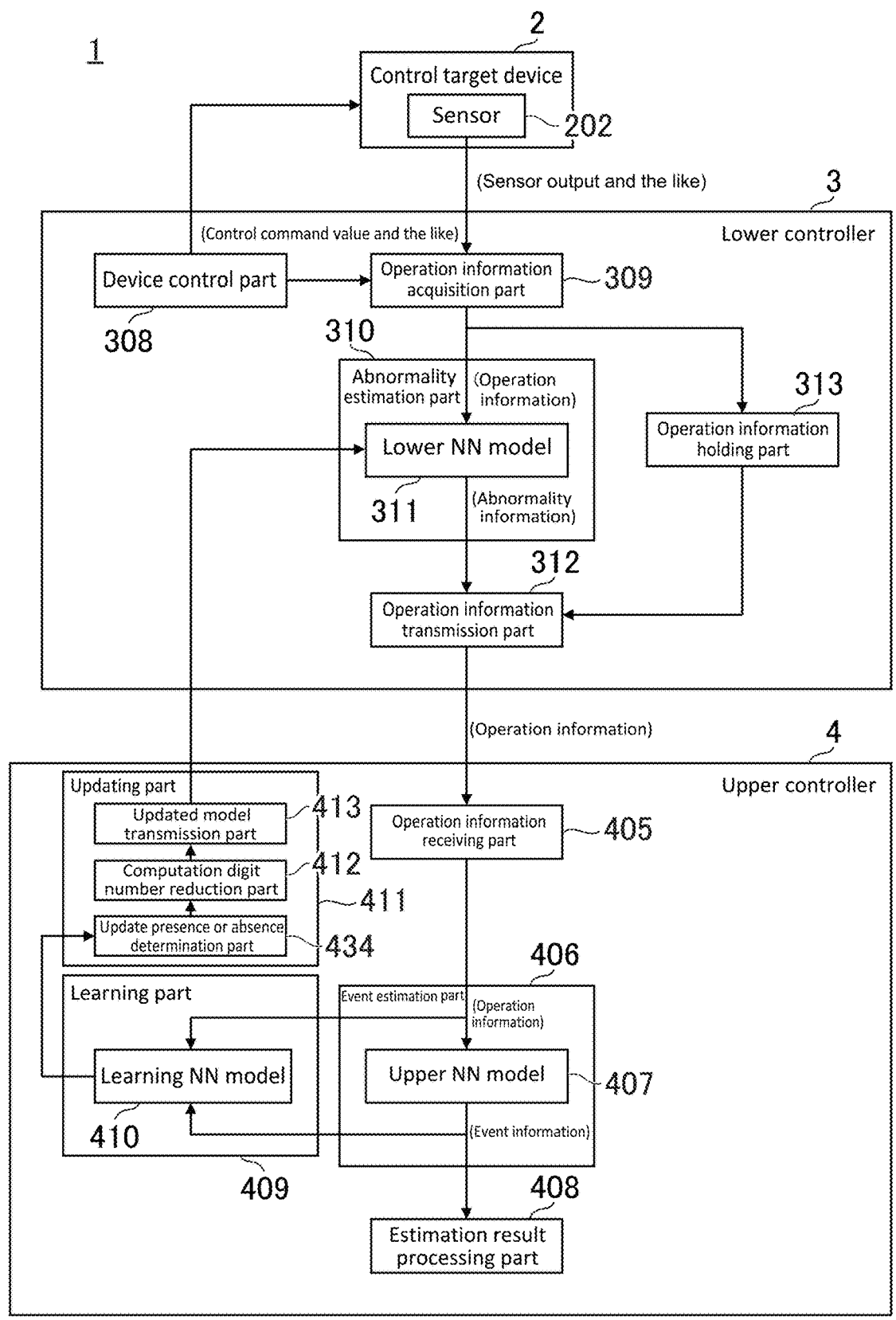
FIG. 4 is a functional block diagram illustrating an overall structure of the event estimation system according to the first embodiment of the present invention.

FIG. 4 is a functional block diagram illustrating an overall structure of the event estimation system 1 according to the present embodiment. Some of the blocks illustrated in FIG. 4 are realized using hardware, and some of the blocks are realized using software using hardware resources such as the processor 306, the processor 403, the memory 305 and the memory 402.

The control target device 2 has the sensor 202 that detects a state of the control target device 2 and outputs a result of the detection to the lower controller 3. Further, the lower controller 3 is provided with a device control part 308 that issues a necessary command or supplies a motive force (power) for controlling the control target device 2. The lower controller 2 controls the control target device 2 by transmitting an appropriate command from the device control part 308 to the control target device 2, receiving information from the sensor 202 and adjusting the command from the device control part 308 using an appropriate method such as feedback control.

In this case, it is thought that a state of the control target device 2 can be estimated from a relation between an output from the sensor 202 and the command from the device control part 308. Therefore, in the lower controller 3, an operation information acquisition part 309 is provided and acquires information about both the output from the sensor 202 and the command from the device control part 308. The information that includes the output from the sensor 202 and the command from the device control part 308 and is for estimating the state of the control target device 2 is referred to as "operation information" hereinafter. That is, it can be said that the operation information acquisition part 309 acquires the operation information of the control target device 2.

When the control target device 2 is a servo motor as in the present example, the acquired operation information includes a record during an operation of the servo motor, such as a current waveform or a speed waveform. It is thought that, when detection of an abnormality in the servo motor or prediction of remaining life in the servo motor due to a change over time such as wear can be performed from such operation information, labor and cost of maintenance such as regular inspections or parts replacements can be greatly reduced, and it helps to prevent an accident or the like caused by a failure or the like. It is difficult for a human to indirectly estimate the state of the control target device 2 from such operation information. However, machine learning using a neural network model or the like is expected to be good at this.

Therefore, the lower controller 3 is further provided with an abnormality estimation part 310 having a lower neural network model 311 which is a machine learning model. Here, the term "lower" is for distinguishing the lower neural network model 311 from an upper neural network model 407 to be described later.

The lower neural network model 311 is a learned neural network model using a so-called deep learning method, and is a computation model that inputs the operation information and outputs abnormality information. The type of the lower neural network model 311 is not particularly limited, and a network model suitable for the type of the operation information may be adopted. The lower neural network model 311 may be a so-called CNN (convolutional neural network), or RNN (recurrent neural network), or a neural network model of another type. In the present example, since the operation information includes time-series information, the lower neural network model 311 uses an RNN based on an LSTM (long short-term memory).

However, as described above, the processor 306 of the lower controller 3 lacks in computing power. And computation by a machine learning model using a neural network model is large-scale parallel computation, and a load of the computation is large. Therefore, the lower neural network model 311 is designed to have a small computation amount and to have a small scale so that computation can be sufficiently performed by the processor 306 with a limited computing power. The scale of the lower neural network model 311 is described in detail later in comparison with the upper neural network model 407.

Further, the abnormality information is information that allows that some noteworthy change in state has occurred or has not occurred in the control target device 2 to be estimated. And, a state in which some noteworthy change in state has occurred in the control target device 2 is called an "abnormality" here. Therefore, the abnormality information is information for estimating presence or absence of an abnormality. An abnormality as used herein does not necessarily mean an abnormality that has an adverse effect. On the other hand, a change in state that has occurred in the control target device 2 is called an "event" hereinafter. The abnormality information estimates whether or not some noteworthy change in state has occurred in the control target device 2, but does not necessarily estimate what change in state has occurred. That is, the abnormality information estimates presence or absence of an abnormality, but does not necessarily estimate an event. Of course, the abnormality information may be able to estimate some or all events.

In the present embodiment, the abnormality information is a numerical value in a range of 0-1 and indicates a certainty that some event has occurred. A predetermined threshold is set for the value of the abnormal information, and, when the abnormality information exceeds the threshold, it may be determined that there is a possibility that some event has occurred. For example, assuming that the threshold is set to 0.6, when the operation information at a certain moment is input to the lower neural network model 311, and 0.1 is output as the abnormality information, it can be determined that no event has occurred. Or, when 0.7 is output as the abnormality information, it can be determined that there is a possibility that some event has occurred. In this way, the abnormality estimation part 310 estimates presence or absence of an abnormality.

The abnormality estimation part 310 performs pre-processing for inputting the operation information to the lower neural network model 311 in a suitable format and post-processing for outputting an output from the lower neural network model 311 as the abnormality information in a suitable format. The parts that perform the pre-processing and the post-processing are not illustrated in FIG. 4.

Determination of whether or not the abnormality information indicates that some event has occurred may be performed by the abnormality estimation part 310, but in the present example, it is performed by an operation information transmission part 312. Based on the abnormality information output from the abnormality estimation part 310, when such abnormality information indicates an abnormality, that is, when there is a possibility that some event has occurred, the operation information transmission part transmits the operation information to the upper controller 4. The operation information output here is the operation information that is input to the lower neural network model 311 of the abnormality estimation part 310 and causes the abnormality information indicating an abnormality to be output.

In the lower controller 3, while computation for estimating an abnormality by the lower neural network model 311 is being performed in the abnormality estimation part 310, acquisition of new operation information by the operation information acquisition part 309 is in progress every moment. Therefore, the operation information output from the operation information transmission part 312 must be the past operation information input to the lower neural network model 311 and not the operation information acquired in real time.

Therefore, the lower controller 3 is provided with an operation information holding part 313, which holds past operation information for a certain time period. The operation information holding part 313 must hold the operation information input to the lower neural network model 311 at least for a time period until the abnormality information based on the operation information is output. This is because, based on the output abnormality information, the operation information transmission part 312 reads, from the operation information holding part 313, the operation information related to the abnormality information.

In reality, for the time period in which the operation information is held by the operation information holding part 313, a time period with a margin is set in consideration of delay or the like in transmission of the information from the operation information transmission part 312 to the upper controller 4. This is because, as already described, the communication speed of the second line 6 between the lower controller 3 and the upper controller 4 is low, and thus it is thought that it may take some time to finish transmitting the operation information to the upper controller 4.

Further, when all the operation information acquired by the operation information acquisition part 309 is to be stored, the operation information holding part 313 must have an extremely large storage capacity, which is not realistic. Therefore, in the present embodiment, the operation information holding part 313 is a so-called ring buffer. When a predetermined capacity is exceeded in storing new operation information, old operation information is discarded and the latest operation information is always accumulated.

In the upper controller 4, an operation information receiving part 405 receives the operation information transmitted from the operation information transmission part 312 of the lower controller 3. In this case, the operation information transmission part 312 may also transmit the abnormality information obtained from the abnormality estimation part 310 to the operation information receiving part 405.

That the operation information is received by the operation information receiving part 405 means that the lower controller 3 has detected an abnormality, that is, means that it has been determined that there is a possibility that some event has occurred. Of course, when the abnormality information is also received, the value of the abnormality information may be taken into consideration in determination. In any case, in the estimation of an abnormality by the abnormality estimation part 310 of the lower controller 3, it is not always possible to identify what the event is, and, it is not possible to accurately estimate whether or not the event is an event that really needs to be dealt with.

Therefore, the upper controller 4 is provided with an event estimation part 406 having the upper neural network model 407. The upper neural network model 407 is also a learned neural network model using a so-called deep learning method, and is a computation model that inputs the operation information and outputs event information. The type of the upper neural network model 407 is also not particularly limited, and a network model suitable for the type of the operation information may be adopted. The upper neural network model 407 may be a CNN, an RNN, or a neural network model of any other type. However, here, the upper neural network model 407 is desirably a model of the same type as the lower neural network model 311. In the present example, similar to the lower neural network model 311, the upper neural network model 407 uses an RNN based on an LSTM.

Here, the event information is information that allows a noteworthy change in state that has occurred in the control target device 2, that is, an event, to be estimated. The event information may be vector-valued. As an example, when there are four types of events estimated by the event information including physical damage, deterioration over time, lack of lubricating oil, lack of warm-up, the event information may a four-dimensional vector. As a specific example, when the event information obtained by the event estimation part is (0.1, 0.7, 0.3, 0.2) and a threshold indicating that an event has occurred is 0.6, it can be estimated that deterioration over time has occurred as an event, and physical damage, lack of lubricating oil and lack of warm-up have not occurred. Of course, the format of the event information is not limited to this example, and other formats may be used. The event estimation part 406 estimates an event by obtaining the event information in this way.

The upper neural network model 407 is characterized by having a large computation amount and a large scale as compared to the lower neural network model 311. That is, the processor 306 of the lower controller 3 lacks in computing power and cannot perform high-load computation, and thus, obtains the abnormal information simply and at a high speed using the small-scale neural network model 311. Therefore, the accuracy of the abnormality information is not necessarily high, and it is not always necessary to individually identify an event that has occurred. On the other hand, the processor 403 of the upper controller 4 has a sufficient computing power and can perform high-load computation, and thus, obtains the event information using the upper neural network model 407 which has a larger scale than the lower neural network model 311. As a result, identification of an individual event that could not be known from only the abnormality information can be more accurately performed.

Event estimation using the upper neural network model 407 by the event estimation part 406 is performed when the operation information is received by the operation information receiving part 405. That is, since it is performed when that there is an abnormality is determined by the abnormality information in the operation information transmission part 312 of the lower controller 3, the event estimation part 406 operates according to the abnormality information. As a result, the event estimation part 406 does not need to perform event estimation for all the operation information obtained from the sensor 202 of the control target device 2 and the device control part 308 of the lower controller 3 every moment, and only needs to perform event estimation for the operation information when the abnormality information has determined that there is an abnormality. Therefore, it is not necessary to transmit all the operation information obtained in real time to the upper controller 4, and it is sufficiently possible to transmit the required operation information using the second line 6 having a relatively low communication speed. Further, it is possible to obtain more accurate event information by using the large-scale upper neural network model 407 and spending a sufficiently long computation time as compared to the control period of the control target device 2.

The scale of a neural network model referred to in the present specification means a size of a computation load in a controller, and may be any size as long as computation thereof matches a computation load in an actual machine. In the present specification, computation is performed by multiplying the number of computations required until an output from an input is obtained in a neural network by the number of digits (the number of bits) of each computation. When this is written as a scale factor (SF) of a neural network model, the scale factor (SF) can be calculated according to the following formula.

$$SF = \sum_{k=1}^{L-1} n_k \cdot n_{k+1} \cdot B_k \qquad \text{Mathematical Formula 1}$$

Here, L is the number of layers of the neural network model; $n_k$ is the number of nodes of the k-th layer when an input layer is the 1st layer, an output layer is the L-th layer, and the 2nd–(L–1)-th layers are hidden layers; and $B_k$ is the number of computation bits of the k-th layer.

Figure 5:
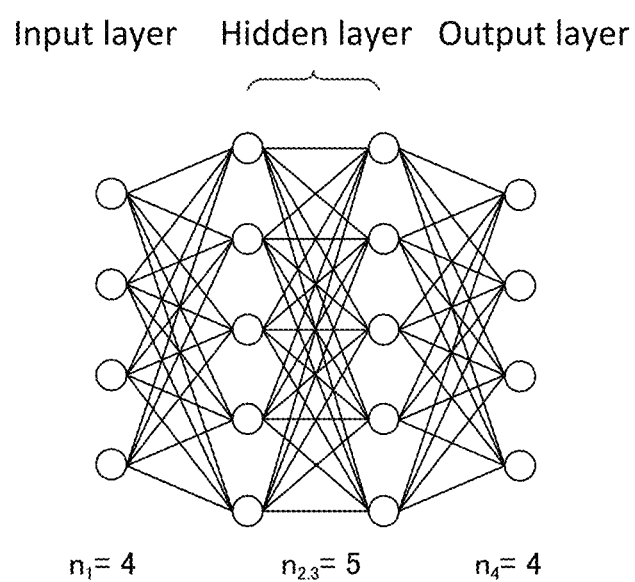
FIG. 5 illustrates an example of a neural network model.

As an example, for the four layers illustrated in FIG. 5, when the number of nodes of each of the input and output layers is 4, the number of nodes of each of the hidden layers is 5, and computation of each of the layers is of 32 bits, the scale factor (SF) is determined as:

$$SF = (4 \cdot 5 + 5 \cdot 5 + 5 \cdot 4) \times 32 = 2080 \qquad \text{Mathematical Formula 2}$$

The lower neural network model 311 and the upper neural network model 407 do not necessarily have matching numbers of layers and matching numbers of nodes of the layers. However, simply by the number of computation bits of the upper neural network model 407, a small-scale lower neural network model 311 is obtained. As a specific example, the number of computation bits of each of the layers of the upper neural network model 407 is 32, whereas the number of computation bits of the lower neural network model 311 is 4. Further, by setting the number of nodes of the output layer of the lower neural network model 311 to 1 and outputting only a scalar value as the abnormality information, or by reducing the number of the hidden layers or the number of nodes of each of the hidden layers, a lower neural network model 311 of a desired scale is obtained.

When a neural network model is an RNN, since the number of recursive processes can be different depending on input data or output data, the number of computations required for certain input data is not always necessarily constant. In such a case, the scale of the neural network model may be evaluated by a scale factor (SF) with respect to one step of a recursive process.

Figure 6:
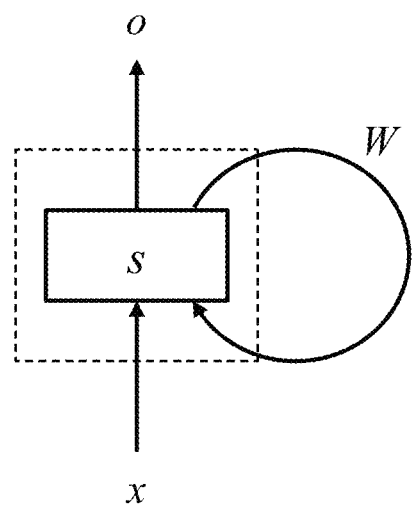
FIG. 6 illustrates a structure of an RNN.

As an example, FIG. 6 illustrates a structure of an RNN. In FIG. 6, "x" indicates an input vector, "o" indicates an output vector, "s" indicates a hidden element (internal state) of the neural network, and "W" indicates recursive computation. For the scale factor (SF), the scale of the neural network model may be evaluated by performing computation with respect to a portion indicated by a broken line frame in FIG. 6 without considering the recursive computation (W).

Returning to FIG. 4, the event information obtained by the event estimation part 406 is passed to an estimation result processing part 408 and is processed according to an estimated event. For example, when physical damage is estimated, a warning is issued to an operator and an instruction to replace a part is given to the operator; when deterioration over time is estimated, a part replacement time period based on a remaining life prediction is displayed; when lack of lubricating oil is estimated, an instruction is given to the operator to add lubricating oil; and so on. In the case of lack of warm-up or a case where a specific event is not detected, since there is no hindrance to the operation of the control target device 2, no need to particularly perform any operation, or an event estimation result as reference information may be displayed.

Further, as is clear from the above description, estimation accuracy of event estimation by the event estimation part 406 using the large-scale upper neural network model 407 is higher and more accurate than abnormality estimation by the abnormality estimation part 310 using the small-scale neural network model 311. Therefore, although the abnormality estimation part 310 estimates that there is an abnormality, in an estimation result by the event estimation part 406 using the same operation information, the events include those such as lack of warm-up that do not hinder operation, and those that do not need to be estimated as that there is an abnormality such as that an event itself is not detected.

Therefore, in the present embodiment, learning of the lower neural network model 311 is dynamically performed based on more accurate event information obtained by the event estimation part 406, and the accuracy of the abnormality estimation of the abnormality estimation part 310 is further increased.

That is, the upper controller 4 is provided with a learning part 409 having a learning neural network model 410, and, in the event estimation part 406, learning of the learning neural network model 410 is performed based on the operation information input to the upper neural network model 407 and the event information output from the upper neural network model 407.

The learning neural network model 410 may be any model and is not particularly limited as long as the learning neural network model 410 is a model of a format in which a learning result thereof can be reflected in the lower neural network model 311 of the lower controller 3. In the present embodiment, in consideration of the accuracy of the learning, a model having the same number of layers and the same number of nodes in each of the layers as the lower neural network model 311 and having a larger number of computation bits of each of the layers is used as the learning neural network model 410. In the present example, the number of computation bits of the learning neural network model 410 is 32, the same as that of the upper neural network model 407.

When event estimation by the event estimation part 406 is performed, the learning part 409 performs the learning of the learning neural network model 410 using an existing method such as a method of backward propagation of errors using training data obtained by using the operation information used in the event estimation as an example problem and using data created based on the event information output from the upper neural network model 407 as a solution. As a result, internal parameters of the learning neural network model 410 are updated.

In the present example, the solution of the training data corresponds to the abnormality information (however, the number of bits is 32, comparing to that of 4 bits used in the lower neural network model 311). For the creation of this solution, for example, it is possible that the solution is set to 1 when the event information obtained by the upper neural network model 407 indicates that an event that needs attention has occurred, and is set to 0 otherwise. Or, the solution may be created by summing or averaging elements that are among the vector values of the event information obtained by the upper neural network model 407 and each indicate an event that needs attention, and weighting according to a nature of an event may also be performed. For example, summing or the like may be performed by setting a larger value for an element indicating a more serious event and a smaller value for an element indicating a less serious event.

The learned and updated learning neural network model 410 is transmitted to an updating part 411, and, first, an update presence or absence determination part 434 determines whether or not the lower neural network model 311 of the lower controller 3 should be updated by the updated learning neural network model 410.

This determination is performed based on whether or not the accuracy of the estimation of the abnormality information (hereinafter simply referred to as the "abnormality information") by the updated learning neural network model 410 is improved. That is, when the abnormality information can be more accurately estimated by the learning, it is meaningful to update the lower neural network model 311; otherwise, it is not necessary to update the lower neural network model 311.

Therefore, the update presence or absence determination part 434 transmits the learning neural network model 410 to a computation digit number reduction part 312 when the accuracy of the estimation of the abnormality information by the updated learning neural network model 410 is improved, and does nothing otherwise. A method for determining improvement in the accuracy by the update presence or absence determination part 434 is not particularly limited. An example thereof is a method in which the update presence or absence determination part 434 holds multiple example problems which are test data sets prepared in advance, and a correct solution rate of estimation results of the abnormality information of the learning neural network model 410 based on the test data sets is evaluated. When the correct solution rate of the learning neural network model 410 before learning exceeds the correct solution rate of the learning neural network model 410 after learning, it can be determined that the accuracy is improved.

The update presence or absence determination part 434 is not always necessarily an essential structural component and may be omitted, and the updated learning neural network model 410 may be always transmitted to the computation digit number reduction part 412.

In the computation digit number reduction part, the number of computation digits is reduced such that the number of computation bits of each layer is equal to that of the lower neural network model 311. In the present example, 32 bits of an internal parameter is reduced to 4 bits. As a result, the learning neural network model 410 becomes equal to the lower neural network model 311 in format.

Then, the learning neural network model 410 of which the number of computation digits has been reduced is transmitted to the lower controller 3 by an updated model transmission part 413, and the lower neural network model 311 of the abnormality estimation part 310 is updated in a form of being replaced. It is thought that, by repeating this operation, the lower neural network model 311 learns such that a result of the event estimation of the upper neural network model 407 can be reflected, and the abnormality information can be more accurately output.

Figure 7:
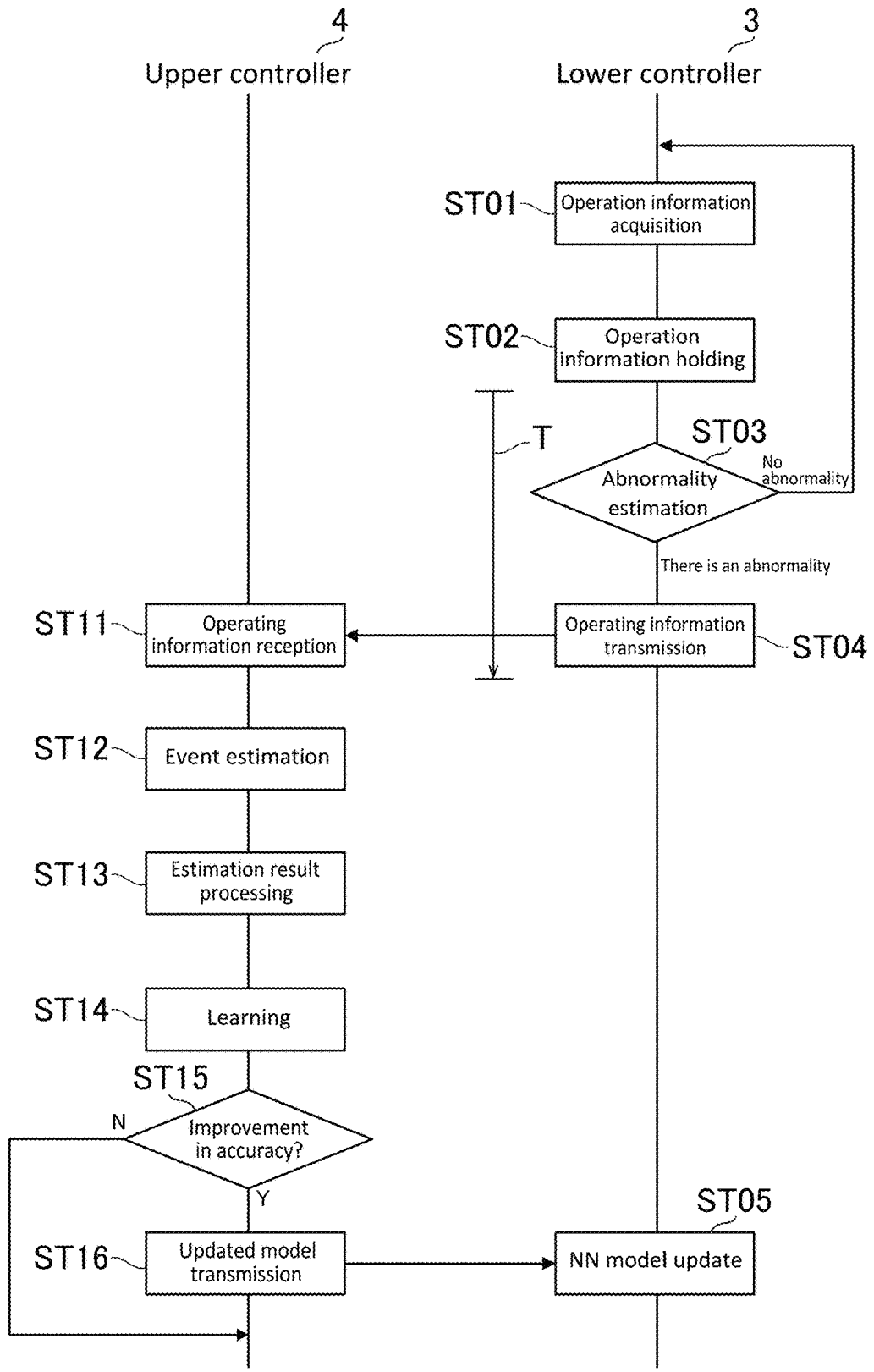
FIG. 7 is a flow diagram describing an operation of the event estimation system according to the first embodiment of the present invention.

FIG. 7 is a flow diagram describing an operation of the event estimation system 1 according to the present embodiment. While the entire control system is operating, the operation information acquisition part 309 of the lower controller 3 acquires the operation information of the control target device 2 (ST01). The acquired operation information is held in the operation information holding part 313 for a predetermined time period (ST02).

Further, the abnormality estimation part 310 computes the abnormality information based on the acquired operation information. When the abnormality information indicates that there is no abnormality, acquisition of the operation information of the control target device is continued. In FIG. 7, for convenience of illustration, after the operation information is acquired in ST01, it is illustrated as if acquisition of the operation information is not performed until it is determined in ST03 that there is no abnormality. However, the acquisition of the operation information is continuously performed in real time during the abnormality estimation or the abnormality determination.

When the abnormality information indicates that there is an abnormality in ST03, the operation information transmission part 312 transmits the operation information held in the operation information holding part 313 to the upper controller 4 (ST04). Therefore, the time period (T) in which the operation information is held in the operation information holding part 313 is at least until the abnormality estimation by the abnormality estimation part 310 is performed, that is, until the output of the abnormality information from the lower neural network 311 is performed, and, preferably, as illustrated in FIG. 7, until the transmission of the operation information from the operation information transmission part 312 is completed. In order to reduce the capacity of the operation information holding part 313 which is a ring buffer, it is also possible that another buffer is provided in the operation information transmission part 312 to store the operation information to be transmitted, and thereby, the holding of the operation information by the operation information holding part 313 is not required during a time period required for the transmission of the operation information. In that case, when the required operation information is read from the operation information holding part 313 to the operation information transmission part 312, the old operation information may be immediately deleted.

The operation information receiving part 405 of the upper controller 4 receives the operation information transmitted from the lower controller 3 (ST11). Based on the received operation information, the event estimation part 406 computes the event information and performs event estimation (ST12). Based on an estimated event, appropriate processing is performed by the estimation result processing part 408 (ST13).

Further, based on the received operation information and the obtained event information, the learning part 409 performs learning of the learning neural network model 410 (ST14). The update presence or absence determination part 434 determines whether or not the updated learning neural network model 410 has improved the accuracy of the estimation of the abnormality information (ST15). When there is an improvement in the accuracy, after adjustment of the number of computation digits or the like is performed, the neural network model is transmitted by the updating part 411 to the lower controller 3 (ST15). Otherwise, the transmission to the lower controller 3 is not performed. For convenience of illustration, the process of ST13 and the processes of ST14-ST16 are illustrated in series. However, these processes may be simultaneously performed in parallel.

The lower controller 3 receives the transmitted neural network model and updates the lower neural network model 311 of the abnormality estimation part 310 (ST05). After that, by repeating this operation, in the control system including the lower controller 3 to which the control target device 2 is connected and the upper controller 4 connected to the lower controller 3, the event estimation system 1 that estimates an event such as a failure or an abnormality of the control target device 2 is realized using machine learning.

Further, according to the embodiment described in the present example, since the lower controller 3 performs abnormality estimation, it is not necessary to transmit all the operation information to the upper controller 4, and a high speed communication line connecting the lower controller 3 and the upper controller 4 is not required. Further, since the upper controller 4 performs event estimation only when the lower controller 3 indicates that there is an abnormality, the computation load of the upper controller 4 is reduced.

Further, by reducing the scale of the lower neural network model 311 used in the lower controller 3, a requirement for the computing power of the lower controller 3 is kept low, and thus, a cost increase of the lower controller 3 is suppressed. On the other hand, by increasing the scale of the upper neural network model 407 used in the upper controller 4 large, the surplus computing power of the upper controller 4 is effectively used, and highly accurate event estimation is performed.

Further, since additional learning and updating of the lower neural network model 311 are performed based on a highly accurate event estimation result of the upper neural network model 407, it can be expected that the accuracy of the abnormality estimation of the lower controller 3 is improved and that a machine difference of the control target device 2 is absorbed.

Figure 8:
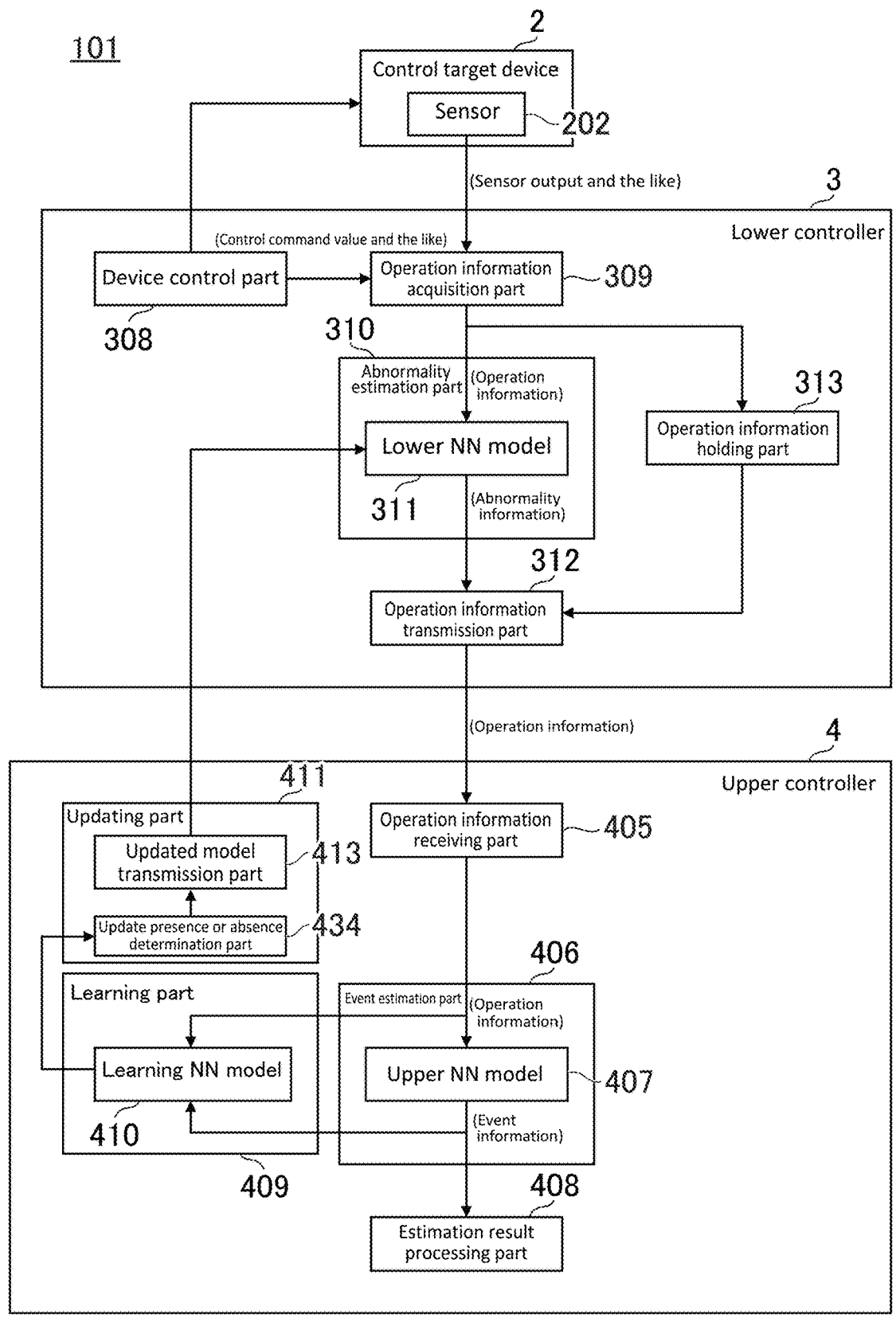
FIG. 8 is a functional block diagram illustrating an overall structure of an event estimation system according to a first modified embodiment of the first embodiment of the present invention.

FIG. 8 is a functional block diagram illustrating an overall structure of an event estimation system 101 according to a first modified embodiment of the above-described first embodiment. FIG. 8 corresponds to FIG. 4 referred to in the description of the first embodiment. Further, since the event estimation system 101 has the same hardware structure as that in the first embodiment, FIGS. 1-3 are incorporated as figures of the present modified embodiment, and a structural component common to the first embodiment is denoted using the same reference numeral symbol and duplicate description thereof is omitted.

In the present modified embodiment, as compared to the event estimation system 1 according to the first embodiment, there are differences only in the learning part 409 and the updating part 411. First, in the learning part 409, the learning neural network model 410 has a larger scale than the lower neural network model 311 in the first embodiment, but has the same scale as the lower neural network model 311 in the present modified embodiment. That is, the number of layers, the number of nodes of each of the layers and the number of computation bits of each of the layers of the learning neural network model 410 are all the same as those of the lower neural network model 311. In other words, the learning neural network model 410 is a mirror model of the lower neural network model 311.

Therefore, after additional learning of the learning neural network model 410 by learning part 409 is performed, it is not necessary to reduce the number of computation digits of the learning neural network model 410. Therefore, a computation digit number reduction part is not provided in the updating part 411. After presence or absence of updating of the lower neural network model 311 is determined by the update presence or absence determination part 434, the updated model transmission part 413 simply transmits the learning neural network model 410 to the lower controller 3, and the lower neural network model 311 of the abnormality estimation part 310 is updated in a form of being replaced.

In the present modified embodiment, as compared to the first embodiment, although the accuracy of the learning is decreased to some extent, the information processing load of the upper controller 4 is reduced, and the memory capacity required for storing the learning neural network model 410 is reduced.

Figure 9:
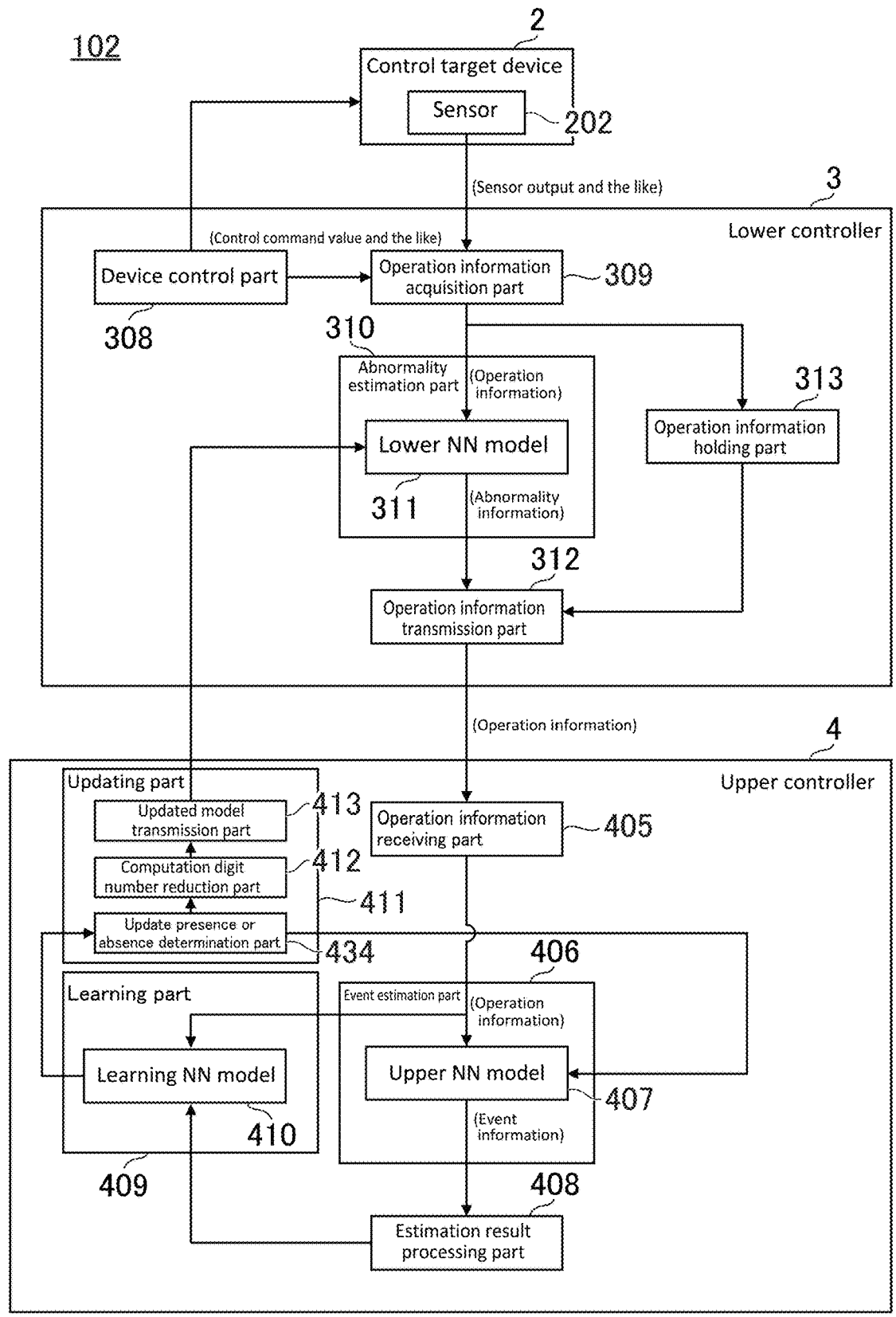
FIG. 9 is a functional block diagram illustrating an overall structure of an event estimation system according to a second modified embodiment of the first embodiment of the present invention.

Further, FIG. 9 is a functional block diagram illustrating an overall structure of an event estimation system 102 according to a second modified embodiment of the above-described first embodiment. FIG. 9 also corresponds to FIG. 4 referred to in the description of the first embodiment. Further, since the event estimation system 102 has the same hardware structure as that in the first embodiment, FIGS. 1-3 are incorporated as figures of the present modified embodiment, and a structural component common to the first embodiment is denoted using the same reference numeral symbol and duplicate description thereof is omitted.

In the present modified embodiment, the upper neural network model 407 of the event estimation part 406 of the upper controller 4 is the same neural network model as the learning neural network model 410 of the learning part 409, and the present modified embodiment is different from the first embodiment and the first modified embodiment in that the upper neural network model 407 itself is also updated.

That is, in the present modified embodiment, the upper neural network model 407 itself is also updated by additional learning and is designed to further improve the accuracy of the event estimation. Therefore, in the event estimation part 406, after computation of the event information by the upper neural network model 407 is performed, a feedback with respect to an event estimation result thereof is used as training data for the learning part 409, and additional learning of the learning neural network model 410 is performed.

As the feedback, for example, it is possible that, in the estimation result processing part 408, an operator inputs a description about an actual state of an actual machine of the control target device 2, and a result thereof is used as a solution, or, the event information obtained by the upper neural network model 407 is analyzed using a separately provided server or the like to obtain a solution. The server preferably accumulates actual failures and maintenance information of a large number of control target devices 2 of the same type and always returns the latest solution.

That is, the learning part 409 creates training data by using the operation information input to the upper neural network model 407 as an example problem and combining it with the solution obtained by the feedback, and performs additional learning of the learning neural network model 410. Therefore, it can be expected that the event estimation by the upper neural network model 407 is also more accurate, reflecting a machine difference and latest findings.

For the learning neural network model 410 updated by learning, presence or absence of updating is determined by the update presence or absence determination part 434. When it is determined that there is an update, the upper neural network model 407 of the event estimation part 406 is updated in a form of being replaced. Further, at the same time, transmission to the computation digit number reduction part 412 of the updating part 411 is performed, and reduction of the number of computation digits is performed, and then transmission to the lower controller 3 by the updated model transmission part 413 is performed. That is, in the present modified embodiment, the lower neural network model 311 used in the abnormality estimation part 310 of the lower controller 3 is obtained by reducing the number of computation digits of the upper neural network model 407.

Next, an event estimation system and an event estimation method according to a second embodiment of the present invention are described with reference to FIGS. 10-13.

Figure 10:
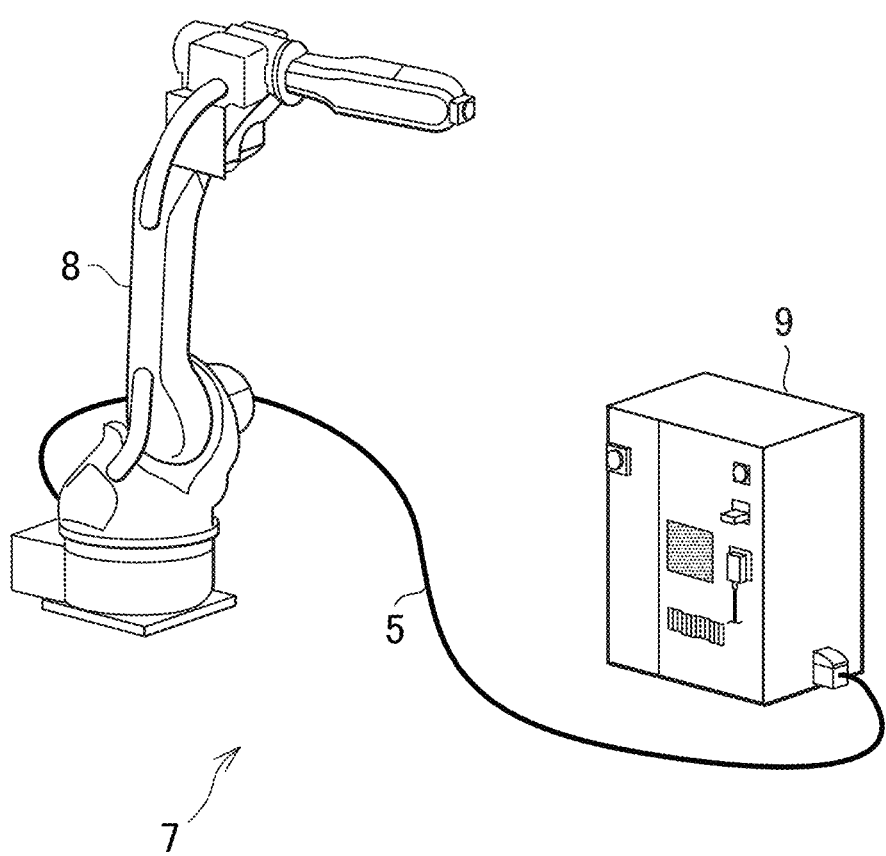
FIG. 10 is an overall external view illustrating an example of an event estimation system according to a second embodiment of the present invention.

FIG. 10 is an overall external view illustrating an example of an event estimation system 7 according to the second embodiment of the present invention. In the following description, a structural component that is the same as or corresponding to a structural component in the first embodiment described above is denoted using the same reference numeral symbol, and redundant description thereof is omitted.

A feature of the event estimation system 7 according to the second embodiment is that multiple lower controllers 3 are connected to an upper controller 4, and control target devices 2 controlled by the multiple lower controllers 3 are not necessarily independent but are related to each other. As an example of such a system, FIG. 10 illustrates a state in which an industrial robot 8 and a robot controller 9 are connected to each other by a first line 5.

The industrial robot 8 is treated as a single device in practice, but from a point of view of control, is a collection of servo motors in a number corresponding to the number of axes thereof. Since the industrial robot 8 illustrated in FIG. 10 has 6 axes, 6 servo motors are mounted in the industrial robot 8. Further, the robot controller 9 is obtained by collectively accommodating, in a casing, servo controllers that respectively correspond to the servo motors and an upper controller that controls the servo controllers. Therefore, the robot controller 9 includes the lower controllers 3 in a number same as the number of the control target devices 2 represented by the servo motors, and the upper controller 4 that controls the lower controllers 3.

Figure 11:
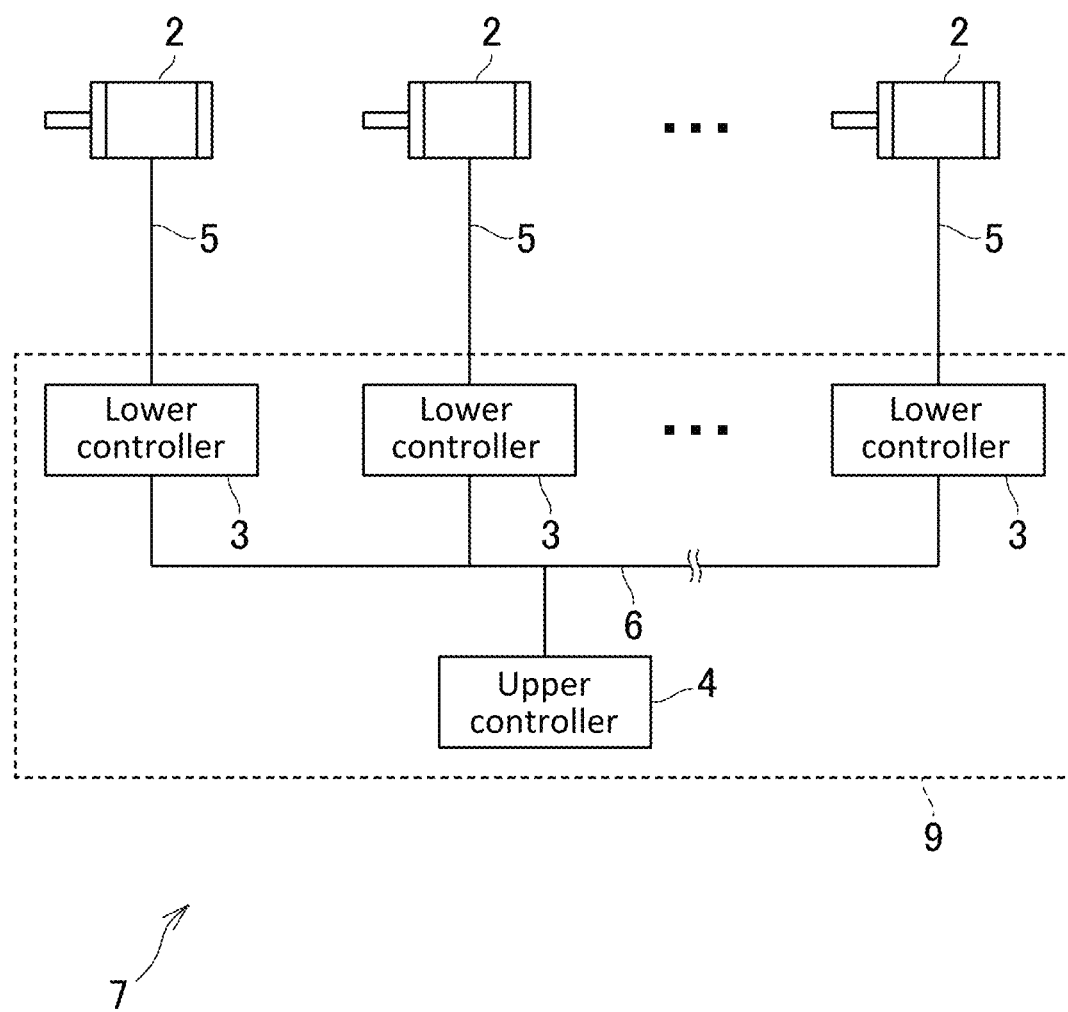
FIG. 11 is a structural diagram illustrating a physical structure of the event estimation system according to the second embodiment of the present invention.

FIG. 11 is a structural diagram illustrating a physical structure of the event estimation system 7 according to the present embodiment. The multiple control target devices 2 (the servo motors in the present example) are respectively connected to the corresponding multiple lower controllers 3 by first lines 5, and the multiple lower controllers 3 are connected to the one upper controller 4 by second lines 6. FIG. 11 illustrates a so-called star connection as a connection mode of the second lines 6. However, the connection mode is not limited to that illustrated in FIG. 11, and other forms of connection such as cascade connection or daisy chain connection may be used. The same applies to the first lines 5. While power lines are individually connected as illustrated, outputs from sensors such as rotary encoders may be cascaded or daisy chained. The same applies to subsequent figures. Further, hardware structures of each of the control target devices 2, each of the lower controllers 3 and the upper controller 4 are respectively the same as those of the first embodiment. Therefore, FIGS. 2 and 3 are incorporated in the description of the present embodiment.

Figure 12:
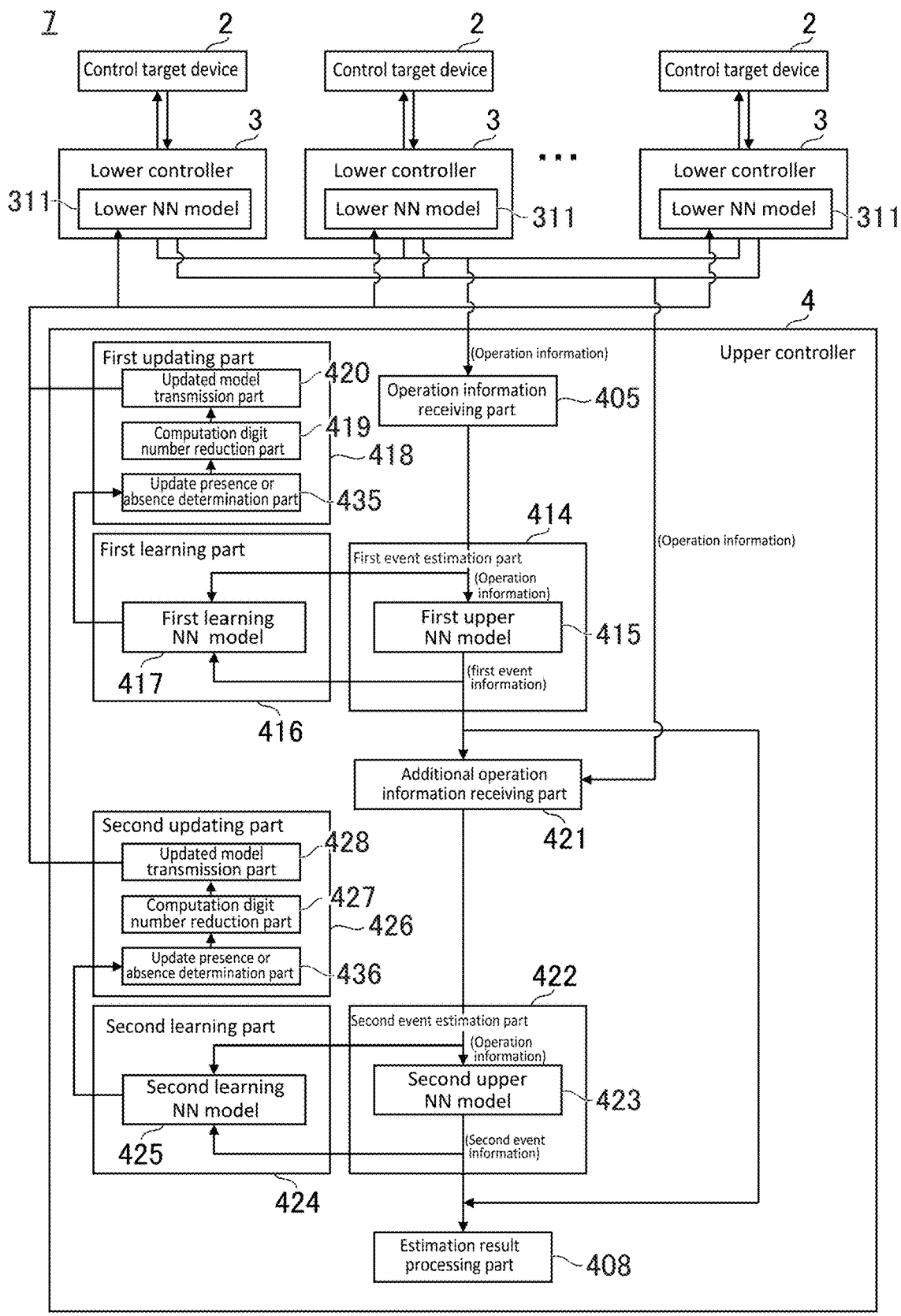
FIG. 12 is a functional block diagram illustrating an overall structure of the event estimation system according to the second embodiment of the present invention.

FIG. 12 is a functional block diagram illustrating an overall structure of the event estimation system 7 according to the present embodiment. Some of the blocks illustrated in FIG. 12 are realized using hardware, and some of the blocks are realized using software using hardware resources such as the processor 306, the processor 403, the memory 305 and the memory 402. Further, a functional structure of each of the control target devices 2 and a functional structure of each of the lower controllers 3 are respectively the same as those illustrated in the first embodiment, and thus, for the details thereof, FIG. 4 is incorporated, and FIG. 12 concisely illustrates only necessary portions.

In FIG. 12, an operation information receiving part 405, a first event estimation part 414 and a first upper neural network model 415, a first learning part 416 and a first learning NN model 417, a first updating part 418, an update presence or absence determination part 435, a computation digit number reduction part 419, an updated model transmission part 420, and an estimation result processing part 408 included in the upper controller 4 respectively have the same functions as and are respectively not different from the operation information receiving part 405, the event estimation part 406 and the upper neural network model 407, the first learning part 409 and the learning NN model 410, the updating part 411, the update presence or absence determination part 434, the computation digit number reduction part 412, the updated model transmission part 413, and the estimation result processing part 408 in the first embodiment.

In the example illustrated in FIG. 12, a state in which the multiple lower controllers 3 are connected to the upper controller 4 is illustrated. Therefore, as illustrated in FIG. 12, the operation information receiving part 405 is connected to the multiple lower controllers 3 and receives operation information from each of the lower controllers 3, and, the updated model transmission part 420 is connected to the multiple lower controllers 3, transmits an updated neural network model to a lower controller 3 that requires the updated neural network model, and updates the lower neural network model 311 thereof.

One first upper neural network model 415 may be prepared for each of the lower controllers 3, that is, first upper neural network models 415 in a number same as the number of the connected lower controllers 3 may be prepared. Or, one first upper neural network model 415 may be prepared for each type of the control target devices 2 as targets. For example, when two types of servo motors having different capacities are used as the control target devices 2, two first upper neural network models 415 respectively corresponding to the two types are prepared.

One first learning neural network model 417 is prepared for each of the lower controllers 3, that is, first learning neural network models 417 in a number same as the number of the connected lower controllers 3 are prepared, and machine differences of the corresponding control target devices 2 are respectively learned by the first learning neural network models 417.

Each of the first upper neural network models 415 in the first event estimation part 414 of the present embodiment is designed to receive input of operation information and output first event information. Here, the first event information is the same as the event information in the first embodiment in that the first event information is information that can estimate a change that has occurred in the control target devices 2 as targets of event estimation. In the present embodiment, in addition to that, the first event information includes another operation information request indicating that other operation information is required.

To describe this point in more detail, as in the present embodiment, when multiple control target devices 2 are included in the event estimation system 7 and the multiple control target devices 2 are related to each other, in order to accurately estimate an event that has occurred in the control target devices 2, it is assumed that operation information related to a single control target device 2 alone is insufficient. For example, to describe according to the example of the present embodiment, when an abnormality is detected at a certain control target device 2, but the occurring event is a deformation of an arm of the industrial robot 8 and affects over multiple servo motors as control target devices 2, it is thought that the event cannot be accurately identified without referring to operation information of all the multiple control target devices 2.

The first upper neural network model 415 determines the first event information for the operation information of a single control target device 2, and, as a result, it is difficult to identify, with sufficient accuracy, an event that occurs over multiple control target devices 2. Therefore, the first upper neural network model 415 is designed to simultaneously output the other operation information request indicating that it is necessary to estimate an event by analyzing operation information of other control target devices 2, in addition to an output indicating an event that independently occurs for a single control target device 2.

To describe using a concrete example, when five types of events are to be estimated by the first event information including the other operation information request in addition to physical damage, deterioration over time, lack of lubricating oil and lack of warm-up, the first event information is a 5-dimensional vector. Then, for example, when values of the first event information is (0.1, 0.3, 0.3, 0.2, 0.7) and a threshold indicating that each of the events has occurred is 0.6, although the physical damage, the deterioration over time, the lack of lubricating oil and the lack of warm-up as events have not occurred for the control target devices 2 as event estimation targets, it is estimated that some event that needs to be analyzed by including operation information of other control target devices 2 has occurred (since the value of the other operation information request is 0.7 which exceeds the threshold).

Therefore, in the event estimation system 7 according to the present embodiment, when the other operation information request is performed in this way (the value thereof exceeds the predetermined threshold), a structure is provided for estimating an event based on the operation information of the other control target devices 2, specifically, all the control target devices 2. In the following, the structure is described.

When the first event information indicates the other operation information request, an additional operation information receiving part 421 additionally receives operation information from the other lower controllers 3. When the first event information does not indicate the other operation information request, since there is no need to receive additional operation information, the first event information is transmitted to the estimation result processing part 408 and necessary processing is performed.

When the additional operation information receiving part 421 receives operation information from the other lower controllers 3, the operation information is transmitted to a second event estimation part 422 and is input to a second upper neural network model 423 included in the second event estimation part 422. The second upper neural network model 423 is a neural network that inputs multiple pieces of operation information and outputs second event information, and is a neural network model having a scale equal to or larger than the first upper neural network model 415. Further, the second event information is information that allows an event occurring over multiple control target devices 2 to be estimated.

The obtained second event information is transmitted to the estimation result processing part 408, and as in the case of the first event information, appropriate processing is performed according to an event estimated by the second event information.

In the present example, the additional operation information receiving part 421 receives operation information from all the other lower controllers 3. However, without being limited to this, it is also possible that, according to the other operation information request obtained from the first event information, the additional operation information receiving part 421 receives operation information from some of the other lower controllers 3. That is, when control target devices 2 related to an event to be estimated can be identified from the first event information, it is only necessary to receive operation information from the related control target devices 2. Further, in the present example, the second upper neural network model 423 is described as a single neural network model that takes all operation information as an input. However, it is also possible that multiple second upper neural network models 423 are prepared according to an event to be estimated. For example, when there are 6 control target devices, it is possible that, when an event related to the 1st-3rd control target devices 2 is estimated, a second upper neural network model 423 that takes operation information related to the 1st-3rd control target devices 2 as an input is used, and when an event related to the 4th-6th control target devices 2 is estimated, another second upper neural network model 423 that takes operation information related to the 4th-6th control target devices 2 as an input is used.

Further, a second learning part 424 and a second updating part 426 are provided as structures for dynamically performing learning of the lower neural network model 311 based on the second event information.

The second learning part 424 has second learning neural network models 425 that are provided respectively corresponding to the lower controllers 3. Then, additional learning with respect to each of the second learning neural network models 425 is performed based on training data obtained by using operation information corresponding to the each of the second learning neural network model 425 as an example problem and combining it with a solution obtained from the second event information.

The second learning neural network models 425 are models equivalent to the first learning neural network models 417 (the two may be shared). Therefore, the second learning neural network models 425 updated by learning are transmitted to the second updating part 426, an update presence or absence determination part 436 determines presence or absence of updating in each of the second learning neural network models 425, and a computation digit number reduction part 427 reduces the number of computation digits, and thereby a scale, of each of the second learning neural network models 425. After that, the second learning neural network models 425 are respectively transmitted to the corresponding lower controllers 3 by an updated model transmission part 428, and the respective lower neural network models 311 are updated in a form of being replaced.

By adopting the structure described above, in the present embodiment, a complex event that occurs over multiple control target devices 2 is estimated with high accuracy. Further, since it is not necessary to always transmit all the operation information acquired every moment by the lower controllers 3 to the upper controller 4, the second lines 5 connecting the lower controllers 3 to the upper controller 4 are not necessary to be high speed. Further, since estimation of a complex event by the upper controller 4 is performed when an abnormality is estimated by the lower controllers 3 and the other operation information request is performed by the upper controller 4, a computation load of the upper controller 4 is reduced.

Further, according to the structure of the present embodiment, since estimation of a complex event by the upper controller 4 is performed even for abnormality estimation in one lower controller 3, even when the complex event indicates, for example, deterioration or damage, detection at an early stage thereof can be expected, and an early response can be performed. Further, since additional learning of the lower neural network models 311 based on the complex event is performed, improvement in the accuracy of the abnormality estimation for the complex event in the lower controllers 3 can be expected.

Figure 13:
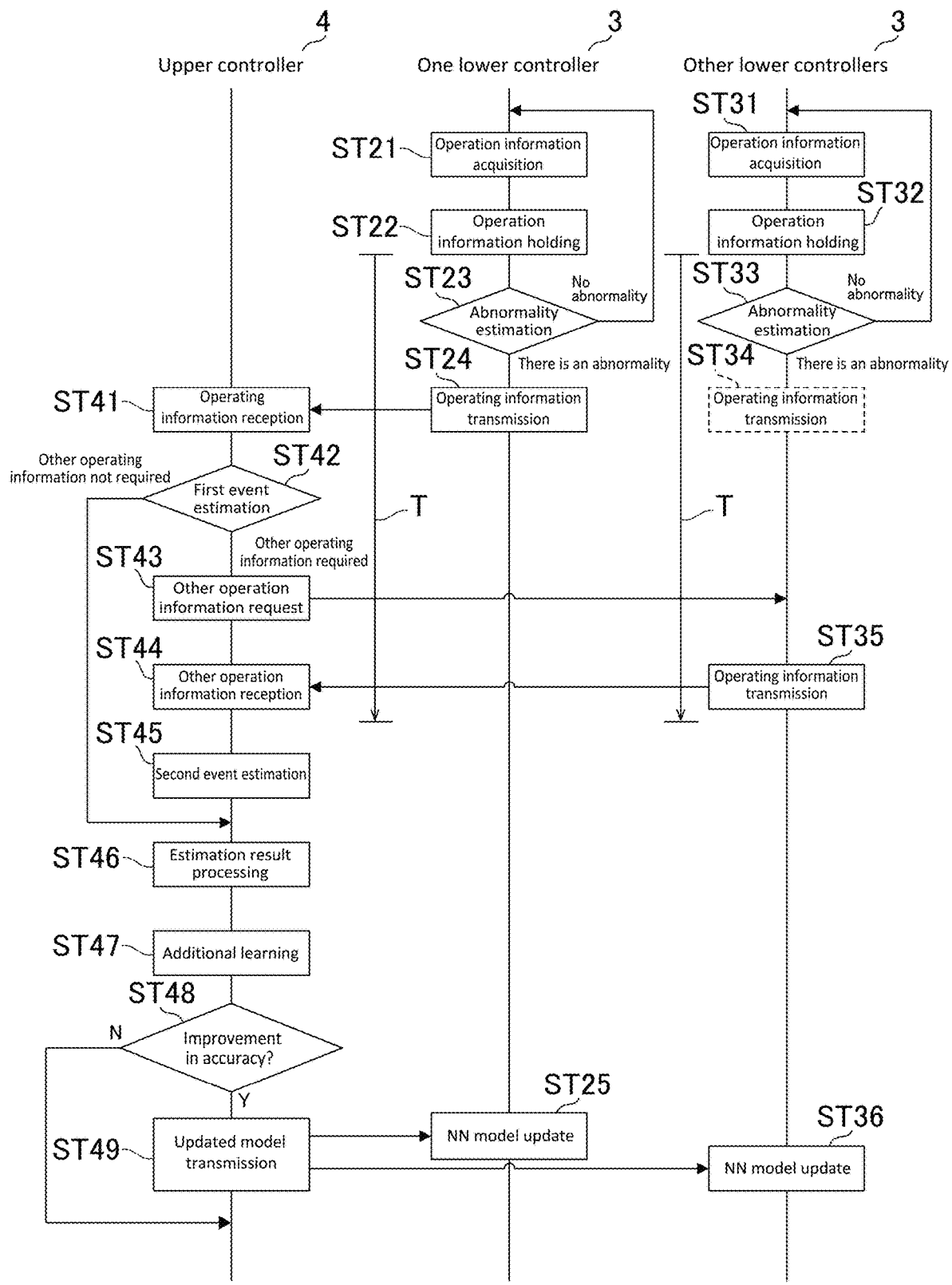
FIG. 13 is a flow diagram describing an operation of the event estimation system according to the second embodiment of the present invention.

FIG. 13 is a flow diagram describing an operation of the event estimation system 7 according to the present embodiment. In the event estimation system 7, the multiple lower controllers 3 are included in the control system. In the present example in which the 6-axis industrial robot 8 is illustrated as an example, the six lower controllers 3 are connected to the upper controller 4. However, in FIG. 13, one lower controller 3 of particular interest is illustrated as "one lower controller" in a central flow, and the other five lower controllers 3 are illustrated as "other lower controllers" in a right flow. Further, a flow on a left side is a flow of the upper controller 4.

The flows of FIG. 13 illustrate an operation of the event estimation system 7 in a case where detection due to a complex event, that is, an event that occurs over multiple control target devices 2 is performed by one lower controller 3. First, in the one lower controller 3, in ST21, the operation information acquisition part 309 acquires operation information of the control target device 2, and in ST22, the operation information is held in the operation information holding part 313 for a predetermined time period. At the same time, in each of the other lower controllers 3, in ST31, the operation information acquisition part 309 acquires operation information of the control target device 2, and, in ST32, the operation information is held in the operation information holding part 313 for a predetermined time period.

In the one lower controller 3, based on the acquired operation information, the abnormality estimation part 310 computes the abnormality information, and determines in ST23 presence or absence of an abnormality. Here, assuming that it is determined that there is an abnormality, the process proceeds to the next step, ST24, in which the operation information transmission part 312 transmits the operation information held in the operation information holding part 313 to the upper controller 4. When in ST23 it is determined that there is no abnormality, the process returns to ST21, in which the acquisition of the operation information is continued. The point that the acquisition and the storage of the operation information are continuously performed during the operation of the control target device 2 is the same as in the case of the first embodiment.

In the other lower controllers 3, similarly, based on the acquired operation information, the respective abnormality estimation parts 310 compute abnormality information, and determine in ST33 presence or absence of abnormality. Here, assuming that it is determined that there is no abnormality, the process returns to ST31, in which the acquisition of the operation information is continued. When in ST33 it is determined that there is an abnormality, in ST34, similar to the one lower controller 3, each operation information transmission part 312 transmits the operation information held in the operation information holding part 313 to the upper controller 4. In FIG. 13, since it is assumed that ST34 is not executed, ST34 is illustrated using a broken line in FIG. 13. Further, also in the other lower controllers 3, the point that the acquisition and the storage of the operation information are continuously performed during the operation of the control target devices 2 is the same as in the case of the first embodiment.

The operation information receiving part 405 of the upper controller 4 receives the operation information transmitted from the one lower controller 3 (ST41). Based on the received operation information, the first event estimation part 414 computes the first event information and determines in ST42 presence or absence of the other operation information request. When the other operation information is not required, that is, when it is determined that there is no other operation information request, appropriate processing is performed by the estimation result processing part 408 based on an estimated event (ST46); additional learning of the first learning neural network model 417 by the first learning part 416 is performed based on the received operation information and the obtained first event information (ST47); and presence or absence of an improvement in the accuracy is determined by the update presence or absence determination part 435 (ST48). When there is an improvement in the accuracy, after adjustment of the number of computation digits or the like is performed, the neural network model is transmitted by the first updating part 418 to the one lower controller 3 (ST49). Otherwise, the transmission to the one lower controller 3 is not performed. The operation from ST46 to ST49 when it is determined that there is no other operation information request is the same as the operation from ST13 to ST16 illustrated in FIG. 7 for the first embodiment. The one lower controller 3 receives the transmitted neural network model and updates the lower neural network model 311 of the abnormality estimation part 310 (ST25).

On the other hand, when it is determined in ST42 that other operation information is required, that is, when it is determined in ST42 that there is the other operation information request, in ST43, the additional operation information receiving part 421 requests each of the other lower controllers 3 to transmit operation information. Here, the operation information related to the other lower controllers 3 is collectively referred to as the other operation information. In ST35, each of the other lower controllers 3 that have received the operation information request transmits the operation information held in the operation information holding part 313 from the operation information transmission part 312 to the upper controller 4. In ST44, the transmitted other operation information is received by the additional operation information receiving part 421.

As is clear from the flows of FIG. 13, in ST35, in order to transmit the other operation information from the other lower controllers 3 to the upper controller 4, in each of the other lower controllers 3, a time period (T) during which the operation information is held in the operation information holding part 313 needs to be at least until the other operation information request from the upper controller 4 is performed, preferably, as illustrated in FIG. 13, until the transmission of the operation information from the operation information transmission part 312 is completed. In the upper controller 4, the other operation information request is performed as soon as the first event information is obtained by the first event estimation part 414 in ST42 and it is determined that the first event information contains the other operation information request. Therefore, it is also possible to say that the time period (T) is at least a time period until the output of the first event information from the first upper neural network model in the first event estimation part 414 is performed.

Similar to the description in the first embodiment, in order to reduce the capacity of the operation information holding part 313 which is a ring buffer, it is also possible that another buffer is provided in the operation information transmission part 312 to store the operation information to be transmitted, and thereby, the holding of the operation information by the operation information holding part 313 is not required during a time period required for the transmission of the operation information.

Further, in describing the present example, in FIG. 13, the multiple lower controllers 3 are illustrated separately as the one lower controller 3 and the other lower controllers 4. However, a lower controller 3 itself cannot know whether it is the one lower controller 3 or belongs to the other lower controllers 3 until the other operation information request is received from the upper controller 4. The reason for this is that even when a certain lower controller 3 has determined that there is an abnormality, the upper controller 4 does not always necessarily performs the other operation information request based on the abnormality, and, it is also possible that, at the same time, another lower controller 3 also similarly determines that there is an abnormality and, based on this abnormality, receives the other operation information request from the upper controller 4.

Therefore, as a result, regardless of whether the lower controller 3 itself is the one lower controller 3 or belongs to the other lower controllers 3, the lower controller 3 holds the operation information in the operation information holding part 313 at least during the time period (T).

Subsequently, in ST45, the second event estimation part 422 of the upper controller 4 inputs all the received operation information to the second upper neural network model 423 and performs computation to obtain the second event information.

Based on an event estimated by the second event information, appropriate processing is performed by the estimation result processing part 408 (ST46); further, based on the operation information and received from the one lower controller 3 and the other lower controllers 3 and based on the second event information, additional learning of the second learning neural network model 425 is performed by the second learning part 424 (ST47); and presence or absence of an improvement in the accuracy is determined by the update presence or absence determination part 436 (ST48). When there is an improvement in the accuracy, after adjustment of the number of computation digits or the like is performed, the neural network model is transmitted by the second updating part 426 to appropriate lower controller 3 (ST49). In the flows illustrated in FIG. 13, in ST25, the lower neural network model 311 of the one lower controller 3 is updated, and in ST36, the lower neural network model 311 of each of the other lower controllers 3 is updated.

After that, by repeating this operation, in addition to the effect obtained by the event estimation system 7 described as the first embodiment, the above-described effect unique to the present embodiment is further obtained. Also in the present embodiment, the same modifications as the examples illustrated as the first modified embodiment and the second modified embodiment of the first embodiment may be added. Technical effects obtained in doing so are the same as those described in the modified embodiments.

In the event estimation system 1 according to the first embodiment and the event estimation system 7 according to the second embodiment described above, the upper neural network model 407 of the event estimation part 406 (in the second embodiment, the first upper neural network model 415 of the first event estimation part 414 and the second upper neural network model 423 of the second event estimation part 422) and the learning neural network model 410 of the learning part 409 (in the second embodiment, the first learning neural network model 417 of the first learning part 416 and the second learning neural network model 425 of the second learning part 424) are prepared as neural network models independent of each other except the second modified embodiment of the first embodiment.

Figure 14:
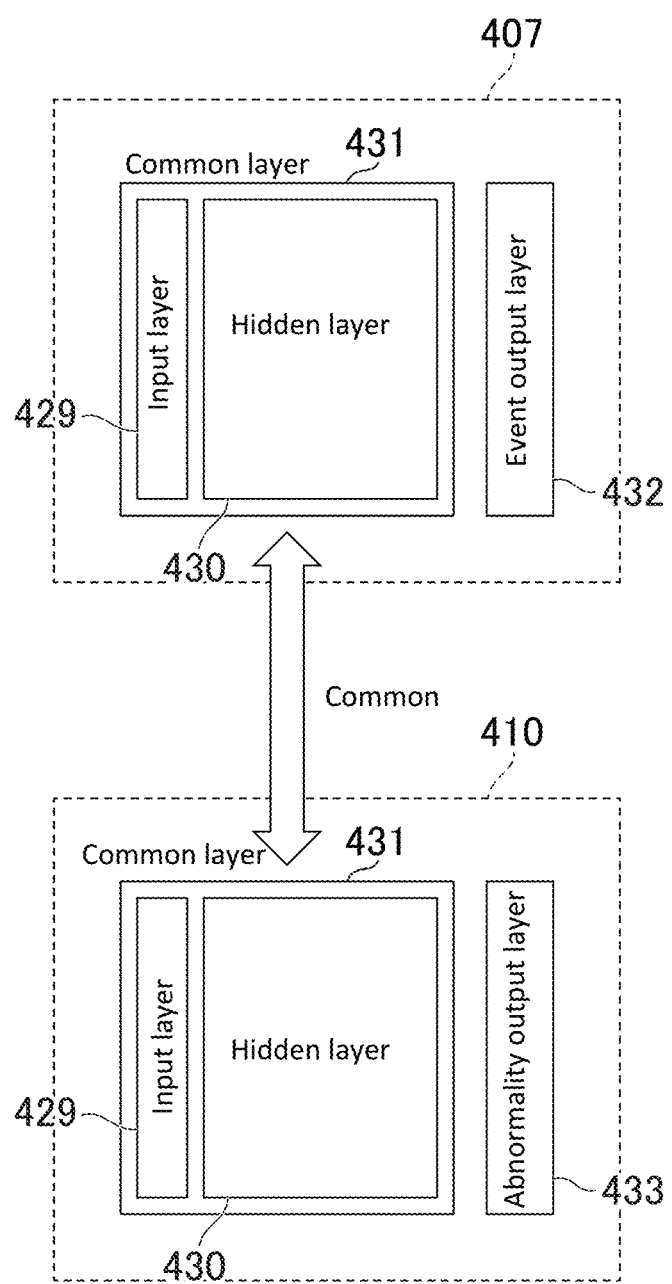
FIG. 14 is a conceptual diagram illustrating structures of an upper neural network model and a learning neural network model which have a common part.

Instead of this, it is also possible that the upper neural network model 407 and the learning neural network model 410 are structured by models having a common part. FIG. 14 is a conceptual diagram illustrating structures of the upper neural network model 407 and the learning neural network model 410 that have a common part.

As illustrated in FIG. 14, the upper neural network model 407 has a format in which an event output layer 432 is joined to a common layer 430 that includes an input layer 429 and a hidden layer 431. The event output layer 432 is an output layer that outputs an output from the hidden layer 431 as event information. The event output layer 432 may be a single-layer output layer or may include any hidden layer before the output layer.

The learning neural network model 410 has a format in which an abnormality output layer 433 is joined to the common layer 430 that is the same as that in the upper neural network model 407 and includes the input layer 429 and the hidden layer 431. The abnormality output layer 433 is an output layer that outputs an output from the hidden layer 431 as abnormality information, and, similar to the event output layer 432, may be a single-layer output layer, or may include any hidden layer before the output layer.

Therefore, the upper neural network model 407 and the learning neural network model 410 share the common layer 431. As a later-stage neural network layer, when the event output layer 432 is used, the neural network model functions as the upper neural network model 407, and, when the abnormality output layer 433 is used, the neural network model functions as the learning neural network model 410.

In this structure, for the learning of the learning neural network model 410, a feedback with respect to the event information obtained from the upper neural network model 407 is used as a solution, which is paired with the operation information to create training data, and additional learning is performed by the learning neural network model 410 which is generated by replacing the event output layer 432 of the upper neural network model 407 with the abnormality output layer 433. Therefore, the creation of the training data in the learning in this structure may be the same as in the second modified embodiment of the first embodiment already described. As a feedback, in the estimation result processing part 408, an operator may input a description about an actual state of an actual machine of the control target device 2 and a result thereof may be used as a solution, or, the event information obtained by the upper neural network model 407 is analyzed using a separately provided server or the like to obtain a solution.

Then, when learning is performed in the learning neural network model 410 and the common layer 431 is updated, the upper neural network model 407, which uses the same common layer 431, is also updated, and learning progresses, and additional learning of the upper neural network model 407 is realized.

Further, updating of the lower neural network model 311 in the lower controller 3 is performed also by performing transfer learning based on the updated common layer 431, in addition to reducing the number of computation digits of the learning neural network model 410. By adopting such a structure, the capacity required for storing the neural network model in the upper controller 4 can be reduced.

In the first embodiment and the second embodiment described above, the abnormality estimation part 310 of the lower controller 3 performs abnormality estimation by obtaining the abnormality information using the lower neural network model 311 which is a neural network model. By adopting such a structure, even when it is difficult to simply perform estimation of presence or absence of an abnormality from the operation information, abnormality estimation can be performed with high accuracy by using machine learning.

Instead of these embodiments, it is also possible that a neural network model based on machine learning is not used in the lower controller 3. In the following, a third embodiment of the present invention is described with reference to FIG. 15.

Figure 15:
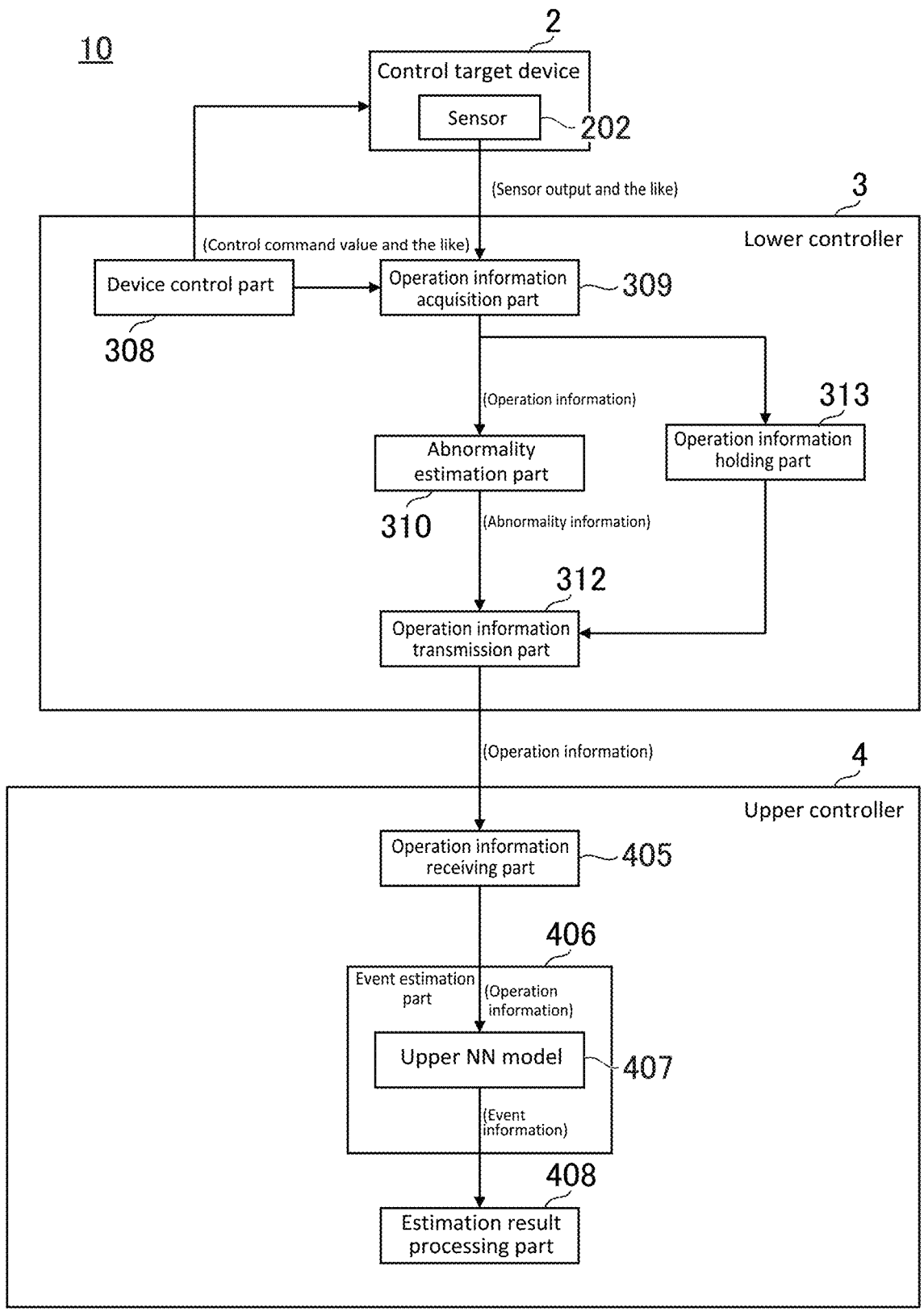
FIG. 15 is a functional block diagram illustrating an overall structure of an event estimation system according to a third embodiment of the present invention.

FIG. 15 is a functional block diagram illustrating an overall structure of an event estimation system 10 according to the third embodiment of the present invention. Similar to that illustrated in FIG. 4 for the first embodiment, in the example illustrated in FIG. 15, there is one control target device 2 and one lower controller 3. However, the point that there may multiple control target devices 2 and multiple lower controllers 3 is the same as in the first embodiment or the second embodiment. Further, in order to simplify the description, a structural component that is the same as or corresponding to a structural component in the previous embodiments is denoted using the same reference numeral symbol, and redundant description thereof is omitted, or, additional description is added only for necessary portions. Further, the physical appearance of the event estimation system 10 is not limited, and the point that a lower controller 3 may be connected to an individual control target device 2 as illustrated in FIG. 1 for the first embodiment, multiple control target devices 2 are associated with each other as illustrated in FIG. 2, and these may be combined is the same as the previous embodiments.

In the event estimation system 10 according to the present embodiment, the abnormality estimation part 310 estimates presence or absence of an abnormality using other methods instead of machine learning using a neural network model. As such a method, for example, a certain value of the operation information or a combination of certain values may be compared with a predetermined threshold. More specifically, it is possible that, when a current value or a temperature value exceeds a specified threshold, it is estimated that there is an abnormality, or, when a combination of two or more parameters is within or outside a specified region, it is estimated that there is an abnormality. Or, it may be simply estimated that there is an abnormality when an abnormal signal is input from the control target device 2, or a combination of these multiple estimation methods may be used.

In any case, information indicating presence or absence of an abnormality as an abnormal signal is transmitted to the operation information transmission part 312. Based on presence or absence of an abnormality estimated by the abnormality estimation part 310, the operation information transmission part 312 transmits the operation information held in the operation information holding part 313 to the upper controller 4. In the upper controller 4, the point that, based on the operation information received by operation information receiving part 405, event estimation based on the event information obtained using the upper neural network model 407 is performed in the event estimation part 406, and appropriate processing is performed in the estimation result processing part 508 is the same as in the case of the previous embodiments.

Even in the structure of the present embodiment, similar to the first embodiment, since the lower controller 3 performs the abnormality estimation, it is not necessary to transmit all the operation information to the upper controller 4, and a high speed communication line connecting the lower controller 3 to the upper controller 4 is not required. Further, since the upper controller 4 performs event estimation only when the lower controller 3 indicates that there is an abnormality, the computation load of the upper controller 4 is reduced.

Figure 16:
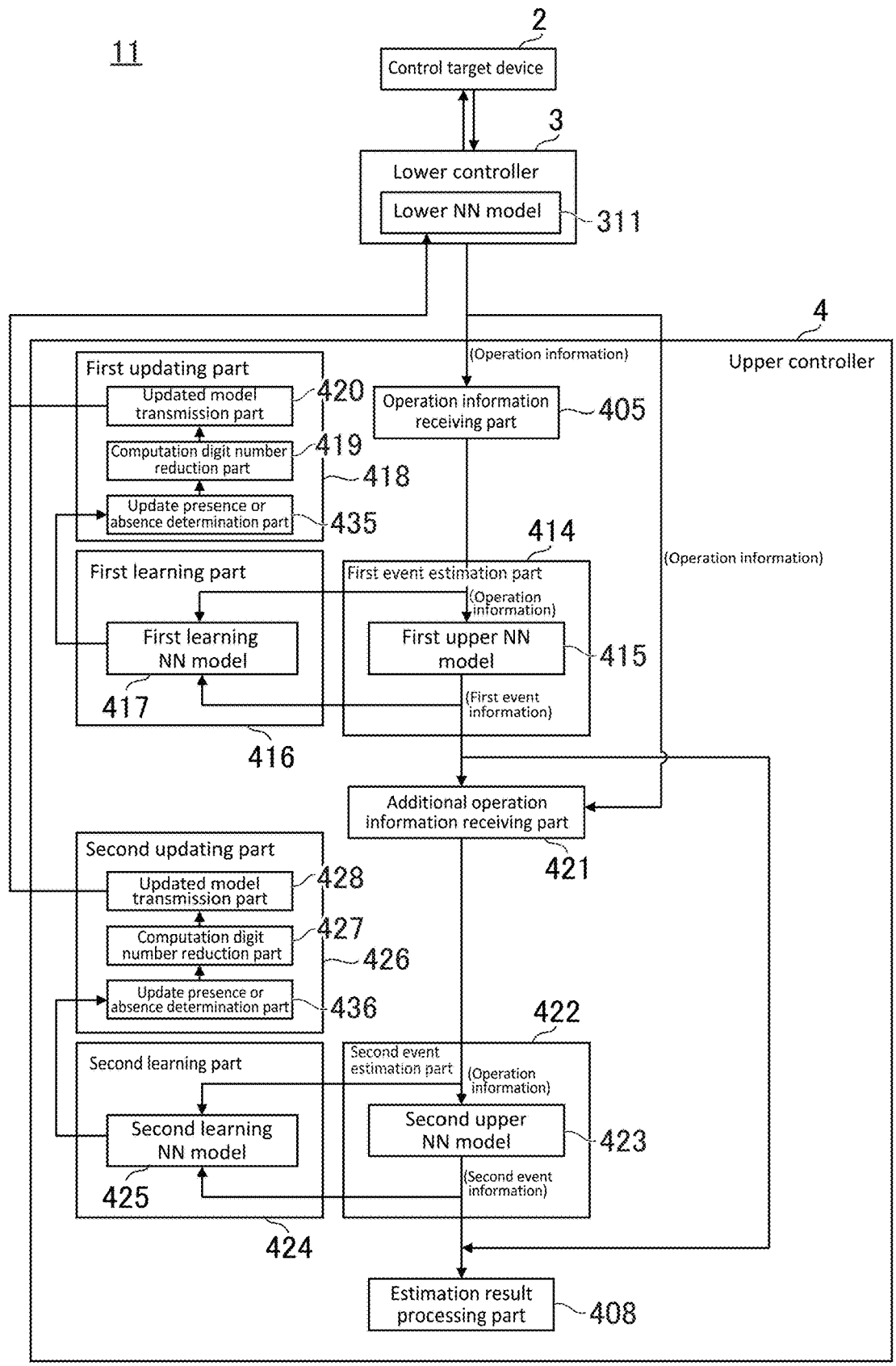
FIG. 16 is a functional block diagram illustrating an overall structure of an event estimation system according to a fourth embodiment of the present invention.

FIG. 16 is a functional block diagram illustrating an overall structure of an event estimation system 11 according to a fourth embodiment which is another embodiment of the present invention. Also in the present embodiment, in order to simplify the description, a structural component that is the same as or corresponding to a structural component in the previous embodiments is denoted using the same reference numeral symbol, and redundant description thereof is omitted, or, additional description is added only for necessary portions.

The overall structure of the event estimation system 11 is similar to that of the event estimation system 9 according to the second embodiment described above, and there is no difference in the individual structures of the control target device 2, the lower controller 3 and the upper controller 4 between the event estimation system 11 and the event estimation system 9. On the other hand, a difference is that, in the second embodiment, multiple lower controllers 3 and multiple control target devices 2 are connected with respect to one upper controller 4, whereas in the present embodiment, it is not necessary to have multiple lower controllers 3 and multiple control target devices 2. Therefore, in order to facilitate understanding, FIG. 16 illustrates a case where there is only one lower controller 3 and only one control target device 2. However, it is also possible to have multiple lower controllers 3 and multiple control target devices 2.

Also in the event estimation system 11 according to the present embodiment, the first upper neural network model 415 of the first event estimation part 414 outputs first event information that includes the other operation information request indicating that other operation information is necessary. However, in the present embodiment, the other operation information includes operation information that is acquired by the lower controller 3 and is not required to be input to the first upper neural network model 415.

To describe this point in more detail, the lower controller 3 continuously acquires a large amount of operation information from the control target device 2, and the operation information is held in the operation information holding part 313 (see FIG. 4 and the like). However, not all the operation information is necessary for the output of the abnormality information of the lower neural network model 311 and the output of the first event information of the first upper neural network model, but only a part of all the operation information is used. For example, a current waveform, a torque waveform, a vibration waveform and a temperature change of the control target device 2 are collected as the operation information. However, in the lower neural network model 311 and the first upper neural network model 415, only the current waveform during that time period is used.

When only a part of the operation information is sufficient for event estimation, appropriate processing by the estimation result processing part 408 may be performed based on a result of the estimation. However, otherwise, that is, when it is determined that the other operation information request is performed in the first event information, additional operation information is received by the additional operation information receiving part 421.

The operation information additionally received may be determined in advance or may be in accordance with the other operation information request. For example, when the other operation information request is performed, it is possible to set in advance to request and receive the torque waveform, the vibration waveform and the temperature waveform as information other than the current waveform which has already been transmitted, or to set in advance to additionally receive operation information over a longer time period when the operation information for a certain time period that has already been received is insufficient as operation information over a time period sufficient for more accurately estimating an event.

Or, it is possible to select a type of operation information that should be additionally received according to the other operation information request, or to set a time period for the operation information that is to be additionally received. In this case, the other operation information request may be a multidimensional vector value.

Further, although it is not illustrated in FIG. 16, similar to the second embodiment, the other operation information request may further indicate that operation information from other lower controllers 3 is additionally requested. The second event estimation part 422 selects a second upper neural network model 423 to be used according to the additionally received operation information and obtains the second event information.

In the structure of the present embodiment, the lower controller 3 estimates presence or absence of an abnormality based on a part of a large amount of acquired operation information, and the upper controller 4 determines whether or not additional operation information is required. Therefore, as a whole, the amount of the operation information that must be transmitted to the upper controller 4 is reduced, a high-speed communication line connecting the lower controller 3 to upper controller 4 is not required, and the computation load of the upper controller 4 is reduced.

Figure 17:
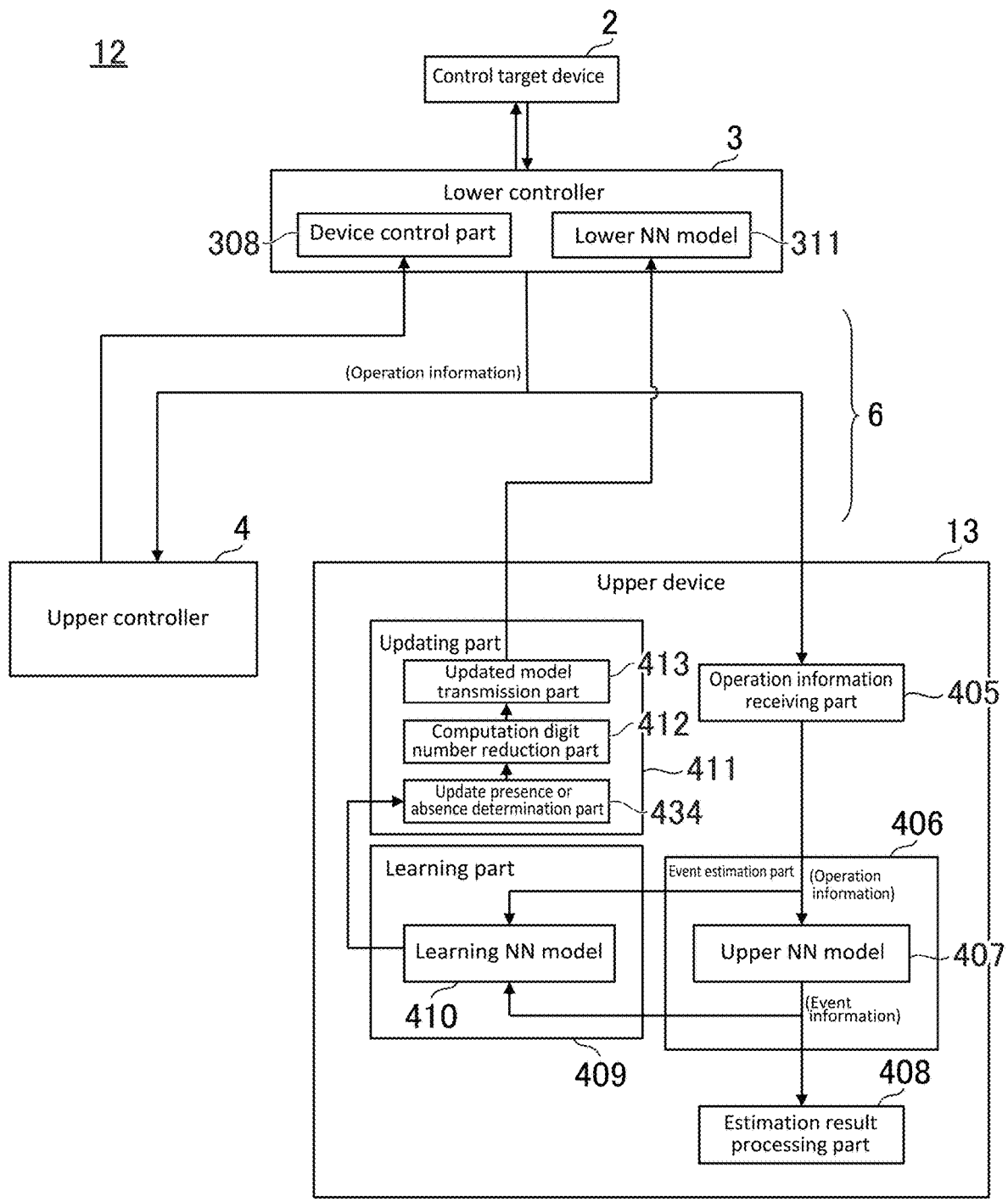
FIG. 17 is a functional block diagram illustrating an overall structure of an event estimation system according to a fifth embodiment of the present invention.

Further, FIG. 17 is a functional block diagram illustrating an overall structure of an event estimation system 12 according to a fifth embodiment which is another embodiment of the present invention. In the present embodiment, the point also applies that, in order to simplify the description, a structural component that is the same as or corresponding to a structural component in the previous embodiments is denoted using the same reference numeral symbol, and redundant description thereof is omitted, or, additional description is added only for necessary portions.

The present embodiment differs from the embodiments described above in that, instead of the upper controller 4, an upper device 13 performs event estimation. To describe this point, the upper controller 4, as already described above, is a controller that indirectly controls the control target device 2 by controlling the lower controller 3. Then, depending on a structure of a control system of the event estimation system 12, it can be assumed that high-load computation is not required for the control itself of the lower controller 3 by the upper controller 4. In such a case, it is possible that a device having a not-so-high computing power is selected as the upper controller 4.

In such a case or the like, it is thought that the upper controller 4 does not have enough computing power to perform event estimation using a neural network model. Therefore, in the event estimation system 12 according to the present embodiment, separately from the upper controller 4, an upper device 13 that performs event estimation is provided. The upper device 13 may be any device as long as the device is an information processing device having computing power for performing event estimation using a neural network model, and a general PC or any device such as a server provided at a remote place may be used as the upper device 13.

Although it may be paradoxical, in the present specification, an information processing device having computing power for performing event estimation using a neural network model is referred to as an upper device. In this sense, all the upper controllers 4 in the first-fourth embodiments described above also each function as an upper device. That is, here, the upper device is not a concept in contraposition to the upper controller, but is a concept that includes the upper controller.

Similar to the upper controller 4, the upper device 13 receives the operation information transmitted from the lower controller 3. FIG. 17 illustrates that the operation information is also transmitted from the lower controller 3 to the upper device 13 via a communication line of the same system as the upper controller 4. As such a communication line, a general communication line suitable for connecting multiple devices may be used, for example, a general-purpose communication line such as an Ethernet (registered trademark) or a communication line for FA such as a mechatronics link (registered trademark) may be used. Or, the connection line from the lower controller 3 to the upper controller 4 and the connection line from the lower controller 3 to the upper device 13 may be independent of each other or may be different from each other. In the present embodiment, regardless of modes of the communication lines, the connection line from the lower controller 3 to the upper controller 4 and the connection line from the lower controller 3 to the upper device 13 are collectively illustrated as the second line 6.

In the present example, the upper controller 4 receives the operation information from the lower controller 3 and transmits an instruction to the device control part 308 of the lower controller 3 at an appropriate timing, and has no difference in function and operation from a general controller used for an FA application, and thus, detailed description thereof is omitted.

The upper device 13 includes the operation information receiving part 405, the event estimation part 406, the estimation result processing part 408, the learning part 409 and the updating part 411 that are described in the previous embodiments, and the function and operation of each of them are also the same as those described above.

As in the present example, by providing the upper device 13 separately from the upper controller 4, even when the upper controller 4 does not have enough computing power for performing event estimation using machine learning, the event estimation system 12 that performs event estimation using machine learning can be constructed. Further, in the case of the present example, as the upper device 13, a sever that is provided at a remote place and has a high computing power can be used for event estimation. In such a structure, the upper device 13 as a server can be used not only by a single event estimation system 13, but can also be shared by multiple event estimation systems 12. Therefore, when multiple event estimation systems 12 are operated, it can be expected that an overall cost is reduced and an effort for constructing the event estimation systems 12 is reduced.

Figure 18:
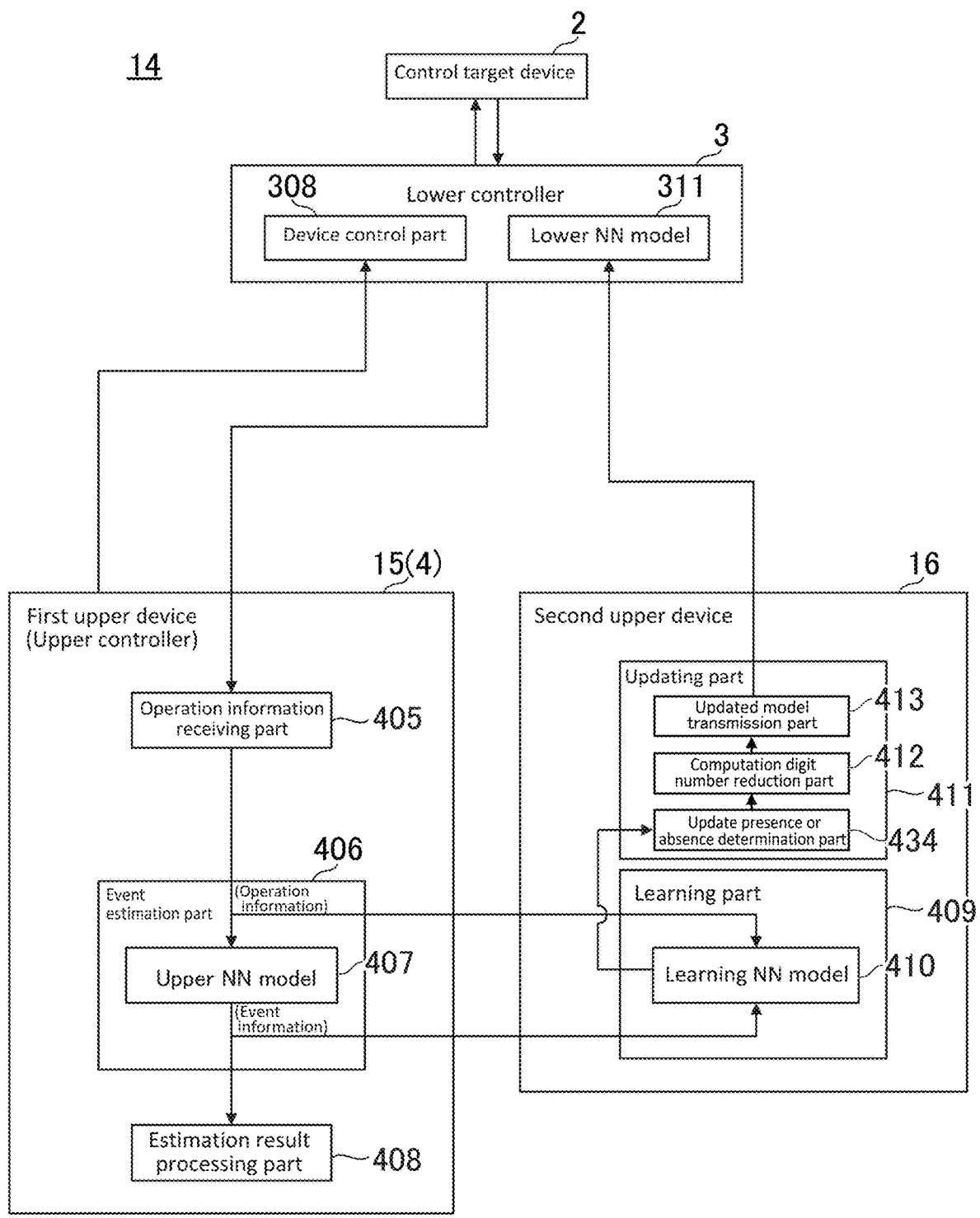
FIG. 18 is a functional block diagram illustrating an overall structure of an event estimation system according to a sixth embodiment of the present invention.

Or, as in a sixth embodiment illustrated below, the function of the upper device may be divided to be performed by multiple devices. FIG. 18 is a functional block diagram illustrating an overall structure of an event estimation system 14 according to the sixth embodiment which is another embodiment of the present invention. In the present embodiment, the point also applies that, in order to simplify the description, a structural component that is the same as or corresponding to a structural component in the previous embodiments is denoted using the same reference numeral symbol, and redundant description thereof is omitted, or, additional description is added only for necessary portions.

The present embodiment differs in that, while the upper controller 4 performs event estimation, another device performs updating of the lower neural network model 311 of the lower controller 3 by learning based on the obtained event information. That is, as illustrated in FIG. 18, the upper device of the event estimation system 14 according to the present embodiment is divided into two upper devices, a first upper device 15 and a second upper device 16, the first upper device 15 having the operation information receiving part 405, the event estimation part 406 and the estimation result processing part 408, and the second upper device 16 having the learning part 409 and the updating part 411.

The first upper device 15 is also the upper controller 4 that indirectly controls the control target device 2 by controlling the lower controller 3, and is usually arranged at a place near the control target device 2 and the lower controller 3 so that, when a processing result from the estimation result processing part 408 is received, for example, an operator can quickly take appropriate measures.

The second upper device 16 is an information processing device having a high computing power, and may be a general PC or a so-called computation server provided at a remote place. The arrangement positions of the first upper device 15 and the second upper device 16 are arbitrary and are not limited.

In the structure of the present embodiment, the first upper device 15 which is also the upper controller 4 receives the operation information from the lower controller 3, and, in the event estimation part 406 thereof, outputs the event information to perform event estimation. Further, based on the obtained event information, the estimation result processing part 408 performs appropriate processing.

At the same time, based on the event information, the first upper device 15 transmits the operation information and the event information to the second upper device 16. In the second upper device 16, based on the received operation information and event information, the learning part 409 performs learning of the learning neural network model 410. In the updating part 411, the update presence or absence determination part 434 determines presence or absence of updating in the learning neural network model 410 for which learning has been performed, and the computation digit number reduction part 412 reduces the number of computation digits thereof, and then, the updated model transmission part 413 transmits the learning neural network model 410 to the lower controller 3, and the lower neural network model 311 is updated. This series of processes is the same as that described in the first embodiment.

As in the present example, by using the second upper device 16 in addition to the upper controller 4, learning of a neural network model that requires a particularly large amount of computation is performed by a dedicated device having an excellent computing power, and event estimation is performed by the upper controller 4 which is the first upper device 15. Thereby, required computations of the event estimation system 14 are distributed so that each of the devices has an appropriate load in accordance with a computation capacity thereof.

The first-sixth embodiments described above are not mutually exclusive, and a person skilled in the art can select and combine the elements thereof appropriately and make necessary modifications. The present invention includes various combinations and modified embodiments thus obtained.

Further, the lower neural network model 311 in the first embodiment has a smaller scale than the upper neural network model 407, and, in the second embodiment and the fourth embodiment, the lower neural network model 311 has a smaller scale than the first upper neural network model 415. However, this is a design considering that the upper controller 4 has a higher computing power than the lower controller 3, and this is not always necessary. That is, it is also possible that the lower neural network model 311 has the same scale as or a larger scale than the upper neural network model 407 or the first upper neural network model 415.

When the lower controller 3 has a sufficiently high computing power, such a design is also possible. In this case, the lower neural network model 311 is particularly suitable for the output of the abnormality information, and the upper neural network model 407 or the first upper neural network model 415 is particularly suitable for the output of the event information or the first event information. Thereby, it can be expected that the accuracy of the event estimation is improved while the computation load of the event estimation system as a whole is reduced.

When using machine learning to diagnose a failure or an abnormality in a control target device represented by an industrial device such as an industrial robot, it is possible to use information about an operation or an internal state of the control target device. In this case, operation information about the control target device is acquired every moment from the control target device and is transmitted to a controller.

When controlling control target devices, it is possible that lower controllers, which are respectively associated with the individual control target devices and respectively directly control the control target devices, and an upper controller, which controls the lower controllers by transmitting operation commands to the lower controllers, are both prepared. For example, in a case of a multi-axis robot, the control target devices correspond to servo motors of the axes of the robot, the lower controllers correspond to servo controllers of the axes, and the upper controller corresponds to a robot controller. Or, even in a case of controlling general motors or measuring instruments, the motors or the measuring instruments correspond to the control target devices, controllers of the motors or the measuring instruments correspond to the lower controllers, and a controller such as a PLC (programmable logic controller) that controls their operations corresponds to the upper controller.

In order to perform fine control, the connection between a control target device and a controller (lower controller) thereof may be designed such that a communication speed thereof that is sufficient for exchanging operation information of the control target device in real time is ensured. On the other hand, for the connection between a lower controller and an upper controller, it is sufficient as long as a communication speed thereof is sufficient for transmitting a command or an operation timing instruction to the lower controller, and thus, the communication speed is low as compared to the connection between the control target device and the controller thereof.

In such a case, when trying to use machine learning to diagnose a failure or an abnormality of a control target device, in order to transmit operation information of the control target device obtained every moment to the upper controller in real time, the communication speed of the connection between the lower controller and the upper controller is insufficient. However, a lower controller lacks in computing power to perform machine learning that requires large-scale computation, such as a neural network model represented by deep learning. Further, providing a lower controller with specifications that enable such computation results in an increase in cost and is not realistic.

A system according to an embodiment of the present invention employs machine learning to estimate an event such as a failure or an abnormality in a control target device in a control system that includes a lower controller to which the control target device is connected, and an upper controller connected to the lower controller.

According to one aspect of the present invention, an event estimation system includes: at least one lower controller; and an upper device, the lower controller having: an operation information acquisition part that acquires operation information of a control target device connected to the lower controller; an abnormality estimation part that estimates presence or absence of an abnormality based on the operation information; an operation information holding part that holds the operation information for a certain time period; and an operation information transmission part that, based on the presence or absence of an abnormality, transmits to the upper device the operation information related to the estimation of the presence or absence of an abnormality, and the upper device having: an operation information receiving part that receives the operation information from the lower controller; and an event estimation part that operates according to the presence or absence of an abnormality, has an upper neural network model that inputs the operation information and outputs event information, and estimates an event.

According to another aspect of the present invention, in the event estimation system, the abnormality estimation part may have a lower neural network model that inputs at least a part of the operation information and outputs abnormality information.

According to another aspect of the present invention, in the event estimation system, the upper neural network may have a larger scale than the lower neural network.

According to another aspect of the present invention, in the event estimation system, the upper device may have: a learning part that has a learning neural network model, which inputs the operation information and outputs the abnormality information, and performs learning of the learning neural network model based on the event information; and an updating part that updates the lower neural network model of the lower controller based on the learned learning neural network model.

According to another aspect of the present invention, in the event estimation system, the updating part may update the lower neural network model of the lower controller when accuracy in estimation based on the learned neural network model has improved.

According to another aspect of the present invention, in the event estimation system, the learning neural network model may have a larger scale than the lower neural network model, and the updating part may have: a computation digit number reduction part that reduces the number of computation digits of the learned learning neural network model; and an updated model transmission part that transmits the learning neural network model for which the number of computation digits has been reduced to the lower controller as the updated lower neural network model.

According to another aspect of the present invention, in the event estimation system, the learning neural network model may have the same scale as the lower neural network model, and the updating part may have an updated model transmission part that transmits the learned learning neural network model to the lower controller as the updated lower neural network model.

According to another aspect of the present invention, in the event estimation system, the operation information holding part may hold the operation information input to the lower neural network model at least for a time period until output of abnormality information from the lower neural network model is performed.

According to another aspect of the present invention, in the event estimation system, the at least one lower controller may comprise multiple lower controllers, and the upper device may further have: an additional operation information receiving part that, based on the event information, additionally receives operation information from the other lower controllers which are different from the lower controller from which the operation information has been received; and a second event estimation part having a second upper neural network model that inputs the operation information from the multiple lower controllers and outputs second event information.

According to another aspect of the present invention, in the event estimation system, the at least one lower controller may comprise multiple lower controllers, and the upper device may further have: an additional operation information receiving part that, based on the event information, additionally receives operation information from the other lower controllers which are different from the lower controller from which the operation information has been received; a second event estimation part having a second upper neural network model that inputs the operation information from the multiple lower controllers and outputs second event information; a second learning part that has an individual learning neural network model that inputs the operation information from the lower controllers, and outputs the abnormality information, and performs learning of the individual learning neural network model based on the second event information; and a second updating part that updates the lower neural network model of the lower controllers based on the learned individual learning neural network model.

According to another aspect of the present invention, in the event estimation system, the individual learning neural network model may have a larger scale than the lower neural network model, and the second updating part may have: a second computation digit number reduction part that reduces the number of computation digits of the learned individual learning neural network model; and a second updated model transmission part that transmits the individual learning neural network model for which the number of computation digits has been reduced to the lower controllers as the updated lower neural network model.

According to another aspect of the present invention, in the event estimation system, the individual learning neural network model may have the same scale as the lower neural network model, and the second updating part may have a second updated model transmission part that transmits the learned individual learning neural network model to the lower controllers as the updated lower neural network model.

According to another aspect of the present invention, in the event estimation system, the operation information holding part may hold the operation information input to the lower neural network model at least for a time period until output of event information from the upper neural network model is performed.

According to another aspect of the present invention, in the event estimation system, the upper neural network model and the learning neural network model may be the same neural network model.

According to another aspect of the present invention, in the event estimation system, the upper neural network model may be divided into a common layer and an event output layer, the learning neural network model may be divided into the common layer which is shared with the upper neural network model, and an abnormality output layer, the learning part may perform learning of the learning neural network model based on the event information, and may update the common layer, and the updating part may update the lower neural network model by performing transfer learning based on the updated common layer.

According to another aspect of the present invention, in the event estimation system, the upper device may further have: an additional operation information receiving part that, based on the event information, additionally receives, from the lower controller, operation information different from the operation information that has already been received; and a second event estimation part having a second upper neural network model that inputs the additionally received operation information and outputs second event information.

According to another aspect of the present invention, in the event estimation system, the upper device may be an upper controller that indirectly controls the control target device by controlling the lower controller.

According to another aspect of the present invention, in the event estimation system, the upper device may be provided separately from an upper controller that indirectly controls the control target device.

According to another aspect of the present invention, in the event estimation system, the upper device may have: a first upper device that functions as an upper controller indirectly controlling the control target device, and includes the operation information receiving part and the event estimation part; and a second upper device that includes the learning part and the updating part.

According to another aspect of the present invention, an event estimation method includes: performing the following in a lower controller: acquiring operation information of a control target device connected to the lower controller; estimating presence or absence of an abnormality based on the operation information; holding the operation information for a certain time period; and, based on the presence or absence of an abnormality, transmitting, to an upper controller, the operation information related to the estimation of the presence or absence of an abnormality; and performing the following in the upper device: receiving the operation information from the lower controller; and estimating an event by causing an upper neural network model to input the operation information and output event information according to the presence or absence of an abnormality.

According to another aspect of the present invention, in the event estimation method, the estimation of the presence or absence of an abnormality may be performed by inputting at least a part of the operation information to a lower neural network model and obtaining abnormality information output from the lower neural network model, and the upper neural network may have a larger scale than the lower neural network.

According to another aspect of the present invention, the event estimation method may further include performing the following in the upper device: based on the event information, performing learning of a learning neural network model that inputs the operation information and outputs the abnormality information; and, based on the learned learning neural network model, updating the lower neural network model of the lower controller.

According to another aspect of the present invention, the event estimation method may further include performing the following in the upper device: based on the event information, additionally receiving operation information from other lower controllers which are different from the lower controller from which the operation information has been received; and causing a second upper neural network model to input the operation information from the multiple lower controllers and to output second event information.

According to another aspect of the present invention, the event estimation method may further include performing the following in the upper device: based on the event information, additionally receiving operation information from other lower controllers which are different from the lower controller from which the operation information has been received; causing a second upper neural network model to input the operation information from the multiple lower controllers and to output second event information; performing learning based on the second event information with respect to an individual learning neural network model that inputs the operation information from the lower controllers and outputs the abnormality information; and, based on the learned learning neural network model, updating the lower neural network model of the lower controllers.

Obviously, numerous modifications and variations of the present invention are possible in light of the above teachings. It is therefore to be understood that within the scope of the appended claims, the invention may be practiced otherwise than as specifically described herein.

What is claimed is:

1. An event estimation system, comprising:
an upper device; and
a lower controller device comprising first circuitry configured to acquire operation information of a control target device connected to the lower controller device, estimate a presence or absence of an abnormality based on the operation information, hold the operation information for a certain time period, and transmit, based on the presence or absence of an abnormality and to the upper device, the operation information related to the estimation of the presence or absence of the abnormality,
wherein the upper device has second circuitry configured to receive the operation information from the lower controller device, and operate according to the presence or absence of the abnormality, input, using an upper neural network model, the operation information, output event information, and estimate an event, and
wherein the upper device is configured to indirectly control the control target device.

2. The event estimation system according to claim 1, wherein the first circuitry is further configured to hold the operation information at least for a time period until output of abnormality information from the lower neural network model is performed.

3. The event estimation system according to claim 2, wherein the first circuitry of the lower controller device and the second circuitry of the upper device are configured such that a speed of obtaining the operation information in the lower controller deice is faster than a speed of receiving the operation information in the upper device.

4. The event estimation system according to claim 1, further comprising:
a plurality of lower controller devices,
wherein the lower controller device is one of the plurality of lower controller devices, and the second circuitry is further configured to additionally receive, based on the event information, second operation information from lower controller devices of the plurality of lower controller devices other than the lower controller device from which the operation information has been received, input, using a second upper neural network model, the second operation information from the plurality of lower controller devices, and output second event information.

5. The event estimation system according to claim 4, wherein the first circuitry is further configured to hold the operation information at least for a time period until output of event information from the upper neural network model is performed.

6. The event estimation system according to claim 5, wherein the first circuitry of the lower controller device and the second circuitry of the upper device are configured such that a speed of obtaining the operation information in the lower controller deice is faster than a speed of receiving the operation information in the upper device.

7. The event estimation system according to claim 4, wherein the first circuitry is configured to input at least a part of the operation information and output abnormality information, and the second circuitry is further configured to input, using an individual learning neural network model, the second operation information from the plurality of lower controller devices, output the abnormality information, teach the individual learning neural network model based on the second event information, and update the lower neural network model of the plurality of lower controller devices based on the taught individual learning neural network model.

8. The event estimation system according to claim 1, wherein the second circuitry is further configured to additionally receive, based on the event information and from the lower controller device, second operation information different from the operation information that has already been received, input, using a second upper neural network model, the additionally received second operation information, and output second event information.

9. The event estimation system according to claim 8, wherein the first circuitry is further configured to hold the operation information at least for a time period until output of event information from the upper neural network model is performed.

10. The event estimation system according to claim 1, wherein the first circuitry is configured to input at least a part of the operation information and output abnormality information.

11. The event estimation system according to claim 10, wherein the upper neural network model has a larger scale than the lower neural network model.

12. The event estimation system according to claim 11, wherein the second circuitry is further configured to input, using a learning neural network model, the operation information, output the abnormality information, teach the learning neural network model based on the event information, and update the lower neural network model of the lower controller device based on the taught learning neural network model.

13. The event estimation system according to claim 12, wherein the upper neural network model is divided into a common layer and an event output layer, the learning neural network model is divided into the common layer which is shared with the upper neural network model, and an abnormality output layer, and the second circuitry is further configured to teach the learning neural network model based on the event information, update the common layer, and update the lower neural network model by transfer teaching based on the updated common layer.

14. The event estimation system according to claim 12, wherein the second circuitry is further configured to update the lower neural network model of the lower controller device when accuracy in estimation based on the taught learning neural network model has improved.

15. The event estimation system according to claim 14, wherein the learning neural network model has a larger scale than the lower neural network model, and the second circuitry is further configured to reduce a number of computation digits of the taught learning neural network model, and transmit the learning neural network model, for which the number of computation digits has been reduced, to the lower controller device as an updated lower neural network model.

16. The event estimation system according to claim 15, wherein the upper neural network model and the learning neural network model are a same neural network model.

17. The event estimation system according to claim 14, wherein the learning neural network model has a same scale as the lower neural network model, and the second circuitry is further configured to transmit the taught learning neural network model to the lower controller device as an updated lower neural network model.

18. The event estimation system according to claim 1, wherein the upper device is an upper controller device comprising third circuitry configured to indirectly control the control target device by controlling the lower controller device.

19. An event estimation system, comprising:
an upper device; and
a lower controller device comprising first circuitry configured to acquire operation information of a control target device connected to the lower controller device, estimate a presence or absence of an abnormality based on the operation information, hold the operation information for a certain time period, and transmit, based on the presence or absence of an abnormality and to the upper device, the operation information related to the estimation of the presence or absence of the abnormality,
wherein the upper device has second circuitry configured to receive the operation information from the lower controller device, and operate according to the presence or absence of the abnormality, input, using an upper neural network model, the operation information, output event information, and estimate an event, and
wherein the upper device is provided separately from an upper controller device comprising third circuitry configured to indirectly control the control target device.

20. An event estimation method, comprising:
acquiring, using a lower controller device, operation information of a control target device connected to the lower controller device;
estimating, using a lower controller device, a presence or absence of an abnormality based on the operation information;
holding, using a lower controller device, the operation information for a certain time period;
based on the presence or absence of the abnormality, transmitting, to an upper controller device, the operation information related to the estimation of the presence or absence of the abnormality, the upper controller device being configured to indirectly control the control target device;
receiving, using the upper controller device, the operation information from the lower controller device; and
estimating, using the upper controller device, an event by causing an upper neural network model to input the operation information and output event information according to the presence or absence of the abnormality.

* * * * *